(12) United States Patent
Ban et al.

(10) Patent No.: US 7,447,576 B2
(45) Date of Patent: Nov. 4, 2008

(54) IN-VEHICLE CONTROL APPARATUS COMMUNICABLY COUPLED THROUGH A COMMUNICATION LINE

(75) Inventors: Yoshinori Ban, Chiryu (JP); Chizuru Sugiura, Okazaki (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 713 days.

(21) Appl. No.: 10/892,207

(22) Filed: Jul. 16, 2004

(65) Prior Publication Data

US 2005/0027404 A1  Feb. 3, 2005

(30) Foreign Application Priority Data

Jul. 16, 2003 (JP) .............................. 2003-275298
May 12, 2004 (JP) .............................. 2004-142757

(51) Int. Cl.
*B60R 16/023* (2006.01)
*H04L 12/00* (2006.01)

(52) U.S. Cl. ........................... 701/36; 701/33; 709/233; 709/235

(58) Field of Classification Search ........................ None
See application file for complete search history.

(56) References Cited

U.S. PATENT DOCUMENTS

| | | | | |
|---|---|---|---|---|
| 5,841,983 A | * | 11/1998 | Takaba et al. ................ 709/225 |
| 6,067,009 A | | 5/2000 | Hozuka et al. | |
| 6,097,316 A | * | 8/2000 | Liaw et al. ................... 340/988 |
| 6,128,560 A | * | 10/2000 | Ishii .............................. 701/29 |
| 6,209,674 B1 | * | 4/2001 | Buhring ....................... 180/282 |
| 6,321,148 B1 | * | 11/2001 | Leung ........................... 701/29 |
| 6,529,530 B1 | * | 3/2003 | Ichii et al. .................... 370/537 |
| 6,553,297 B2 | * | 4/2003 | Tashiro et al. ................. 701/48 |
| 6,728,749 B1 | * | 4/2004 | Richardson ................. 709/200 |
| 6,901,469 B2 | * | 5/2005 | Ito ............................... 710/240 |
| 2001/0002449 A1 | * | 5/2001 | Eisenmann et al. ............ 701/1 |

FOREIGN PATENT DOCUMENTS

| | | |
|---|---|---|
| EP | 869039 | 6/2003 |
| JP | 3-128542 | 5/1991 |
| JP | 10-274602 | 10/1998 |
| JP | 11-201872 | 7/1999 |

\* cited by examiner

*Primary Examiner*—Michael J. Zanelli
(74) *Attorney, Agent, or Firm*—Nixon & Vanderhye PC

(57) ABSTRACT

A control apparatus is communicably coupled through an in-vehicle communication line to a device. The control apparatus is operative to control an equipment unit installed therein. In the control apparatus, a determining unit receives a request transmitted from the device. The request includes information related to the device and the control apparatus. The determining unit is configured to determine whether the received request corresponds to a previously specified request according to the information of the received request. A changing unit changes a way of transmitting response data against the received request according to a result of the determination, thereby increasing a first responsibility against the received request corresponding to the specified request, as compared with a second responsibility against the received request except for the specified request.

23 Claims, 11 Drawing Sheets

IN-VEHICLE CONTROL APPARATUS COMMUNICABLY COUPLED THROUGH A COMMUNICATION LINE

CROSS REFERENCE TO RELATED APPLICATION

This application is based upon and claims the benefit of priority of the prior Japanese Patent Application 2003-275298 filed on Jul. 16, 2003, and the prior Japanese Patent Application 2004-142757 filed on May 12, 2004 so that the descriptions of which are incorporated herein by reference.

BACKGROUND OF THE INVENTION

1. Field of the Invention

The present invention relates to a control apparatus installed in a vehicle for controlling a device, such as an engine, installed in the vehicle. In particular, the present invention relates to the control apparatus that is capable of communicating with at least one other unit through a communication line.

2. Description of the Related Art

In a conventional vehicle, such as an automobile, an in-vehicle LAN (Local Area Network) composed of a plurality of communication lines is provided in the vehicle, and a plurality of electronic control units (ECUs) are also installed in the vehicle to be communicably coupled to the communication lines of the in-vehicle LAN. The ECUs communicate with one another through the in-vehicle LAN so that they control various types of devices installed in the vehicle.

One of the communication systems using the in-vehicle LAN adopts a predetermined communication procedure such that, when at least one ECU receives a command from at least one of the other ECUs, at least one of the ECU sends response data against the received command to at least one of the other ECUs through the in-vehicle LAN.

An external diagnostic scan tool can be communicably coupled to the communication lines of the in-vehicle LAN. The diagnostic scan tool is operative to diagnose the condition of a vehicle at a predetermined location, such as a vehicle maintenance shop. For example, when diagnosing a specific ECU that controls the engine of the vehicle in the ECUs, which is referred to as "engine ECU", the diagnostic scan tool is set to establish communication with the specific ECU and sends a request thereto. The request is to output data representing the current engine state, such as the temperature of engine cooling water, the revolutions of the engine, and the like, and/or data representing the location of a fault.

The engine ECU receives the request transmitted from the diagnostic scan tool and sends data that is stored therein and corresponds to the request to the diagnostic scan tool as response data.

These communications between an ECU and the diagnostic scan tool are referred to as "diagnostic communications". Response characteristics of the ECU to specific requests used for the diagnostic communications, such as time elapsed from the reception of the specific requests by the ECU to the start of transmitting response data with respect to the received specific requests, have already been established by the laws, such as ISO (International Organization for Standardization) 15031-5 or ISO 15765-4.

Moreover, when receiving requests transmitted from other ECUs, each conventional vehicle-installed ECU is configured to transmit pieces of data to all of the other ECUs at the same timings.

On the other hand, Japanese Unexamined Patent Publication NO. H11-201872 discloses a vehicle-installed system having a plurality of ECUs and a transponder unit that are communicable with each other through a communication line. Each of the ECUs is configured to diagnose vehicle-installed devices and to transmit the diagnostic results to a control center located at the exterior of the vehicle in response to the request.

In this system, each of the ECUs is operative to determine whether a period during which its load required for controlling the devices is higher than a predetermined amount occurs, and to ignore, when the period occurs, the request to transmit the diagnostic results during the period.

When each of the conventional ECUs installed in a vehicle receives requests transmitted from other ECUs installed therein, each of the conventional ECUs is configured to transmit pieces of response data corresponding to the requests to all of the other ECUs, respectively, When requests are transmitted from other ECUs, each ECU installed therein is configured to transmit pieces of data, in response to the requests, to all of the other ECUs, respectively. The responsiveness of each of the conventional ECUs with respect to the other ECU's requests are identical with those thereof with respect to the specified requests, which meet the response characteristics established by the laws set forth above. This may cause processing loads of each of the conventional ECUs to increase.

In the engine ECU, for example, it is assumed that the engine ECU receives the requests transmitted from the other ECUs at the large engine-ECU loads, such as at high engine revolutions or at engine starting.

In this assumption, the responsiveness of the engine ECU for transmitting the pieces of response data with respect to the other ECU's requests may be identical with those thereof for transmitting pieces of response data with respect to the specified requests. This may result in that the large processing loads required for the transmitting of the pieces of the response data with respect to the other ECU's requests may be additionally applied on the engine ECU so that the engine ECU may skip a part of the engine control processes. This may require a high-performance processing unit as the engine ECU, as compared with the usual engine ECU.

SUMMARY OF THE INVENTION

The present invention is made on the background for reducing processing loads of a control unit for a vehicle in response to requests transmitted from other control units for the vehicle while keeping responsiveness with respect to a specified request.

According to one aspect of the present invention, a control apparatus communicably is coupled through an in-vehicle communication line to at least one device for controlling an equipment unit installed therein. The control apparatus is provided with a determining unit configured to receive a request transmitted from the at least one device. The determining unit is configured to determine whether the received request corresponds to a previously specified request. The control apparatus is also provided with a changing unit. The changing unit is configured to change a way (i.e., a mode) of transmitting response data with respect to the received request according to a result of the determination by the determining unit. This allows a first responsiveness with respect to the received request corresponding to the specified request to increase, as compared with a second responsiveness with respect to the received request except for the specified request.

According to another aspect of the present invention, a control apparatus is communicably coupled through an in-vehicle communication line to at least one device for controlling an equipment unit installed therein. The control apparatus is provided with an identifying unit. The identifying unit is configured to receive a request transmitted from the at least one device. The request includes information representing a content thereof. The identifying unit is configured to identify a content of the received request according to the information. The control apparatus is provided with a load detecting unit. The load detecting unit is configured to detect a process load required to control the equipment unit. The control apparatus is provided with a monitoring unit. The monitoring unit is configured to monitor a traffic load in the in-vehicle communication line. The control apparatus is provided with a load reducing unit. The load reducing unit is configured to reduce a communication load required to transmit response data with respect to the received request according to the identified content of the received request, the detected load, and the monitored traffic load.

According to a further aspect of the present invention, a control apparatus is communicably coupled through an in-vehicle communication line to at least one device for controlling an equipment unit installed therein. The control apparatus comprises an identifying unit configured to receive a request transmitted from the at least one device. The request includes information representing a content of the request and a source of transmitting the request. The identifying unit is configured to identify a content of the received request and a source of transmitting the received request according to the information. The control apparatus also has a load detecting unit configured to detect a process load required to control the equipment unit. The control apparatus further has a monitoring unit configured to monitor a traffic load in the in-vehicle communication line. The control apparatus has a load reducing unit configured to reduce a communication load required to transmit response data with respect to the received request according to the identified content of the received request, the identified source of transmitting the request, the detected load, and the monitored traffic load.

According to a still further aspect of the present invention, a control apparatus is communicably coupled through an in-vehicle communication line to at least one device for controlling an equipment unit installed therein. The control apparatus is provided with a computer configured to execute a traffic load determining process to monitor a traffic load in the in-vehicle communication line and to determine whether the monitored traffic load exceeds a predetermined threshold level. The control apparatus is provided with a request determining process to receive a request transmitted from the at least one device and to determine whether the received request corresponds to a previously specified request when the monitored traffic load exceeds the predetermined threshold level. The control apparatus is provided with a changing process to change a mode of transmitting response data with respect to the received request when the received request corresponds to the previously specified request, thereby increasing a first responsiveness with respect to the received request corresponding to the specified request as compared with a second responsiveness with respect to the received request except for the specified request.

According to a still further aspect of the present invention, a program product is stored in a computer-readable storage unit and includes a program readable by a computer. The computer is communicably coupled through an in-vehicle communication line to at least one device for controlling an equipment unit installed therein. The program causes the computer to receive a request transmitted from the at least one device, thereby determining whether the received request corresponds to a previously specified request. The program causes the computer to change a mode of transmitting response data with respect to the received request according to a result of the determining process to increase a first responsiveness with respect to the received request corresponding to the specified request, as compared with a second responsiveness with respect to the received request except for the specified request.

According to a still further aspect of the present invention, a method of communicating through an in-vehicle communication line with at least one device installed in a vehicle and controlling an equipment unit installed therein is provided. The method includes receiving a request transmitted from the at least one device. The method includes determining whether the received request corresponds to a previously specified request. The method also includes changing a mode of transmitting response data with respect to the received request according to a result of the determining step to increase a first responsiveness with respect to the received request corresponding to the specified request, as compared with a second responsiveness with respect to the received request except for the specified request.

BRIEF DESCRIPTION OF THE DRAWINGS

Other objects and aspects of the invention will become apparent from the following description of embodiments with reference to the accompanying drawings in which.

DETAILED DESCRIPTION OF AN EMBODIMENT OF THE INVENTION

An embodiment of the invention will be described hereinafter with reference to the accompanying drawings.

Figure 1:
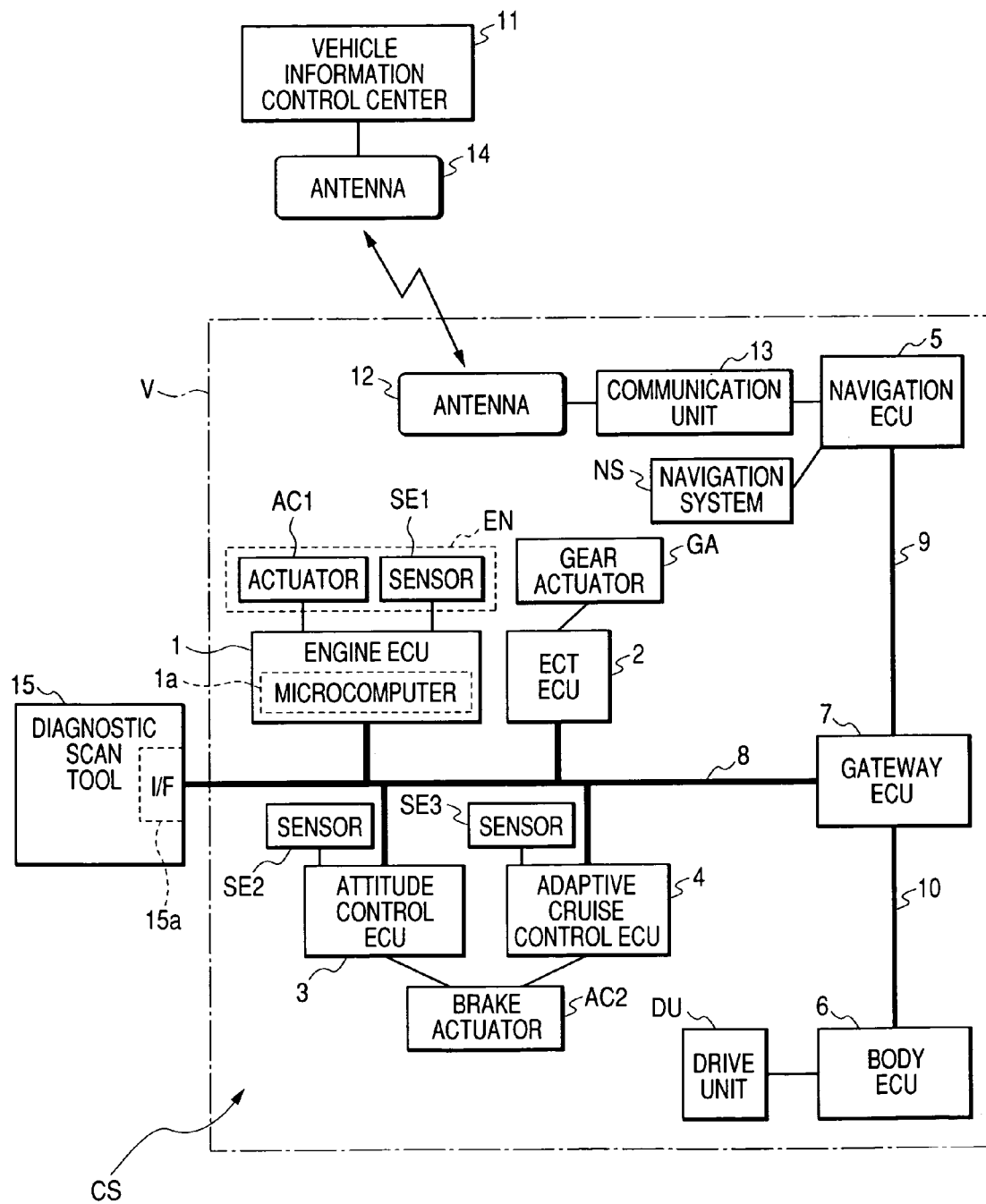
FIG. 1 is a schematic block diagram of a vehicle control system installed in a vehicle according to an embodiment of the present invention.

FIG. 1 is a schematic block diagram of a vehicle control system CS installed in a vehicle V according to an embodiment of the present invention.

As shown in FIG. 1, the vehicle control system CS is provided with an engine ECU 1 to which this embodiment of the present invention is applied. The vehicle control system CS is also provided with an electronically controlled transmission (ECT) ECU 2, an attitude control ECU 3, an adaptive cruise control ECU4, a navigation ECU 5, a body ECU 6, and a gateway ECU 7. The ECUs 1-7 are nodes in an in-vehicle LAN that is composed of different communication lines, such as a control communication line 8, a multimedia communication line 9, and a body communication line 10.

The engine ECU 1 is electrically coupled to engine state sensors SE1 of the engine EN for detecting data indicative of the current state of the engine EN.

That is, the engine state sensors SE1 include a throttle sensor for detecting the position of an accelerator pedal, the throttle position of a throttle valve of the engine EN, and a speed sensor for detecting the speed of the vehicle V. The engine state sensors SE1 also include an engine revolution sensor for detecting the engine revolutions of the engine EN, a temperature sensor for detecting the cooling water temperature of the engine EN, and a sensor for detecting the battery voltage of the engine EN.

These detected pieces of data (the accelerator position, the throttle position, the engine speed, the engine revolutions, the cooling water temperature, and the battery voltage) represent the current state of the engine EN, so that these detected pieces of data are referred to simply as "engine state data" hereinafter.

The engine ECU 1 is also electrically coupled to actuators AC1, such as a throttle actuator, an injector actuator, an ignition actuator, and other similar actuators.

That is, the engine ECU 1 controls the actuators AC1 based on the detected engine state data to optimally set the position of the throttle valve, the amount of fuel, the ignition timing, and so on.

The ECT ECU 2 is electrically connected to a gear actuator GA of the vehicle V and operative to control the gear actuator GA to automatically shift the gear ratios of a gear box of an automatic transmission in response to the vehicle speed and the acceleration.

The attitude control ECU 3 is electrically coupled to sensors SE2 for detecting the current attitude (the current running condition) of the vehicle V. The attitude control ECU 3 is also electrically coupled to brake actuators AC2 for actuating brakes attached to the wheels of the vehicle V.

That is, the attitude control ECU 3 detects whether the running condition of the vehicle V is stable according to the current attitude of the vehicle V and, when the running condition of the vehicle V is unstable, optimally controls the brake actuators AC2 to keep the running condition of the vehicle V stable.

The adaptive cruise control ECU 4 is electrically coupled to a sensor SE3 attached to the front portion of the vehicle V for detecting the distance between the vehicle V and at least one other vehicle that runs in front of the vehicle V. The adaptive cruise control ECU 4 is also electrically coupled to the brake actuators AC2.

The adaptive cruise control ECU 4 is operative to control the brake actuators AC2 to brake the vehicle V according to the detected distance, thereby maintaining a safe cruising distance between the vehicle V and at least one other vehicle and/or keeping the vehicle's speed constant.

The engine ECU 1, the ECT ECU 2, the attitude control ECU 3, and the adaptive cruise control ECU 4 are communicably coupled to each other via the control communication line 8.

The control communication line 8 is communicably coupled to the gateway ECU 7. The gateway ECU 7 is communicably coupled to the navigation ECU 5 via the multimedia communication line 9, and to the body ECU 6 through the body communication line 10, respectively.

The navigation ECU 5 is electrically coupled to a navigation system NS to control it, and the body ECU 6 is electrically connected to drive mechanisms DU of the body electronics, such as the doors and the door windows. The body ECU 6 is operative to control the drive units DU to drive the body electronics, such as to lock and unlock the doors and to raise and lower the door windows.

In the in-vehicle LAN, the gateway ECU 7 interconnects the different communication lines 8-10 to allow the ECUs 1-4, 5, and 6, which are coupled to the different communication lines 8-10, to be communicated with each other. That is, the gateway ECU 7 is operative to relay data among the ECUs 1-6 through the different communication lines 8-10.

The vehicle control system CS is also provided with an antenna 12 and a communication unit 13 that are communicably coupled to each other. The communication unit 13 is operative to communicate through the antenna 12 and an antenna 14 to a vehicle-information control center 11 by radio waves to receive various types of information, such as updated traffic information from the center 11. The communication unit 13 is also operative to access the center 11 to transmit to the center 11 various types of information related to the vehicle V, such as the current position of the vehicle V detected by, for example, a GPS (Global Positioning System), installed in the navigation system NS.

Each of the ECUs 1-6 communicates with at least one of the other ECUs through the in-vehicle LAN according to at least one predetermined communication protocol. For example, when each of the ECUs 1-6 receives a request transmitted from at least one of the other ECUs, each of the ECUs 1-6 sends response data with respect to the received request to at least one of the other ECUs according to at least one predetermined protocol. In this embodiment, CAN (Controller Area Network) protocol is used as at least one predetermined communication protocol.

On the other hand, an external diagnostic scan tool 15, which corresponds to a diagnostic unit in this embodiment, has an interface (I/F) 15a that can be communicably coupled to the control communication line 8 by wire or wireless connection. The diagnostic scan tool 15 is operative to communicate with at least one of the ECUs 1-6 through the communication lines 8-10 to diagnose the condition of the vehicle V at a predetermined location, such as a vehicle maintenance shop.

The engine ECU 1 is equipped with a microcomputer 1a having a first function for controlling the engine EN (the actuators AC1) according to the engine state data set forth above and a second function for communicating with the other ECUs 2-6 and the diagnostic scan tool 15.

Figure 2:
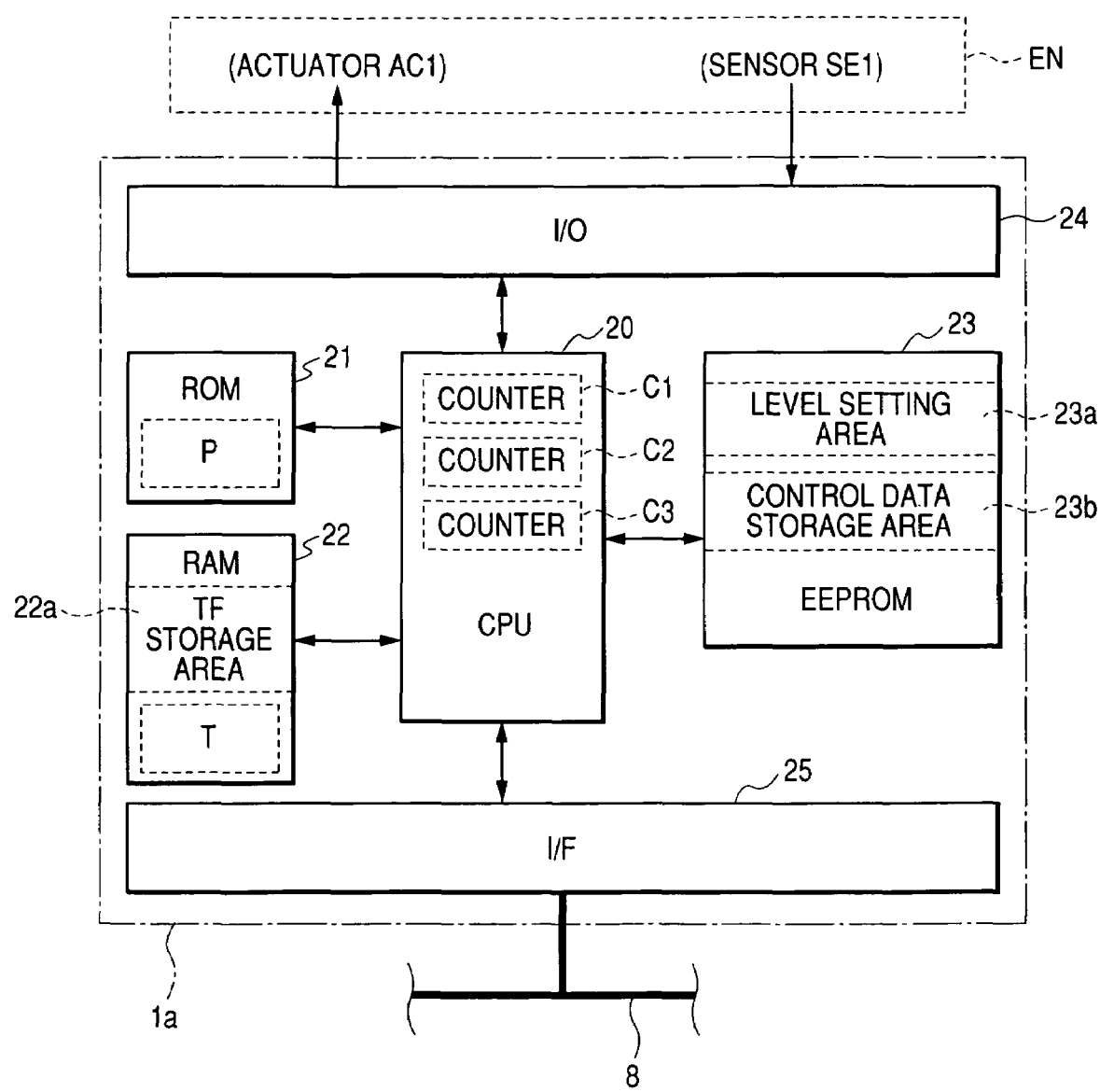
FIG. 2 is a schematic block diagram of an engine ECU shown in FIG. 1 according to the embodiment of the present invention.

In particular, as shown in FIG. 2, the microcomputer 1a is composed of a CPU 20, a ROM (Read Only Memory) 21, a RAM (Random Access Memory) 22, an EEPROM (Electrically Erasable Programmable Read Only Memory) 23, an input/output (I/O) unit 24, and a communication interface (I/F) 25.

The CPU 20 has a general register that includes a first counter (transmitting interval counter) C1, a second counter (a continuous transmitting frame number counter) C2, and a third counter (a continuous transmitting wait time counter) C3, which are described hereinafter in detail.

The ROM 21 previously stores therein programs that cause the CPU 20 to execute at least the first and second functions. A program P in the programs corresponds to the second function.

The RAM 22 allows the CPU 20 to use (write and/or read) the data storage area thereof. The RAM 22 has a transmitting frame (TF) storage area 22a allocated at a predetermined address, and previously stores a process load determining table T at a predetermined address thereof, which is described hereinafter.

The EEPROM 23 has a level setting area 23a allocated at a predetermined address. A communication process load reducing level is settable in the level setting area 23a. The communication process load reducing level is referred to simply as "load reducing level" hereinafter. The EEPROM 23 also has a control-data storage area 23b allocated at a predetermined address. The control-data storage area 23b previously stores therein control data required to control the actuators AC1.

The I/O unit 24 is configured to electrically couple between the CPU 20 and each of the sensors SE 1 and each of the actuators AC1. The communication interface 25 is configured to establish communication links between the CPU 20 and the in-vehicle LAN (the control communication line 8) under the CAN protocol.

Figure 3:
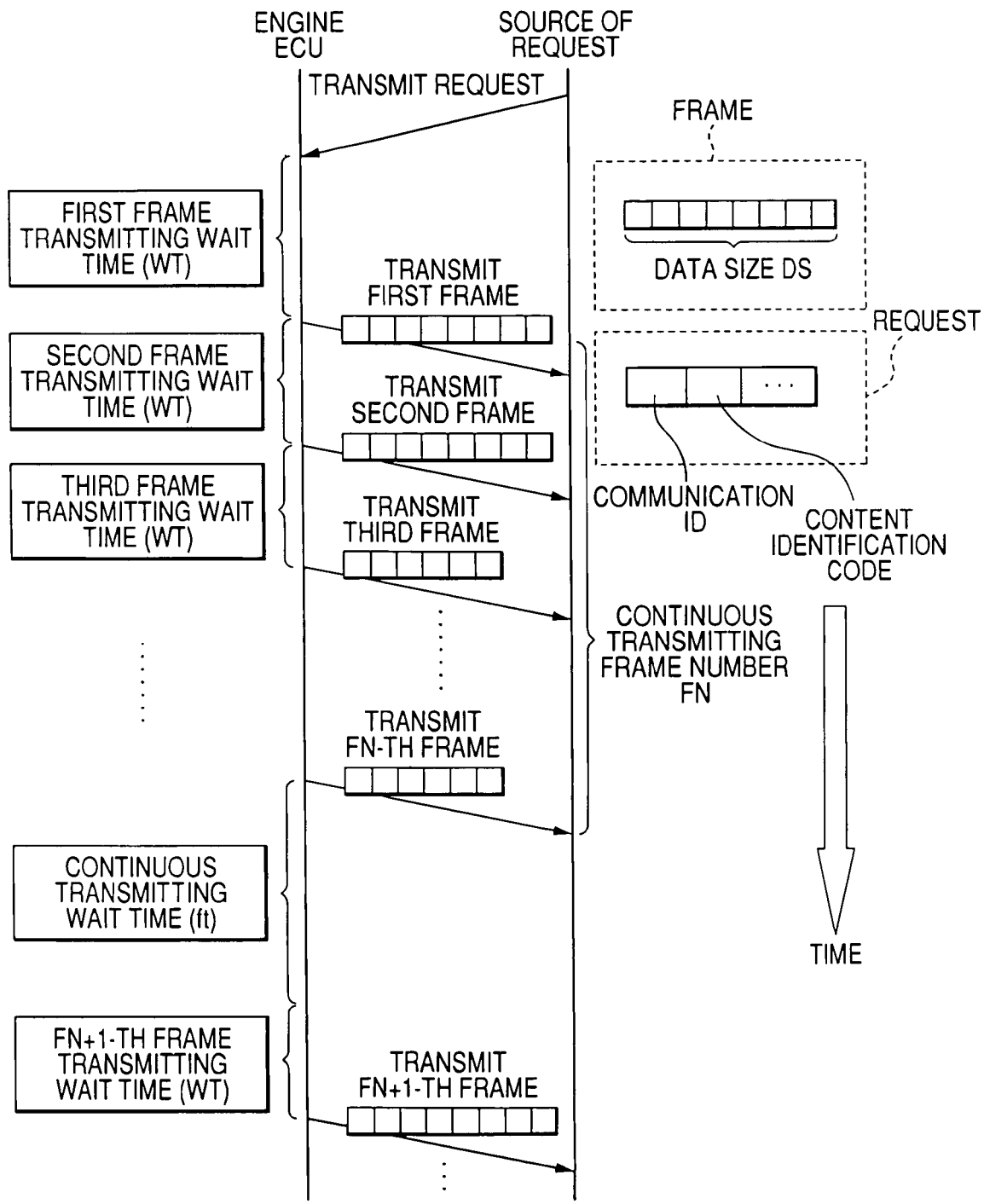
FIG. 3 is a flowchart schematically illustrating operations of the engine ECU when the engine ECU transmits response data against a request transmitted from other ECUs or a diagnostic scan tool according to the embodiment.

Next, the engine ECU's operations of transmitting the response data with respect to the request transmitted from at least one of the other ECUs 2-6 or the diagnostic scan tool 15 will be schematically explained according to FIG. 3.

As shown in FIG. 3, the information included in the request has a communication ID (identification) representing the source of it, which corresponds to source information in this embodiment. The information included in the request also has a content identification code indicative of the content, such as type, of the information, which corresponds to identification information in this embodiment.

As shown in FIG. 3, when receiving the request transmitted from at least one of the ECUs 2-6 or the diagnostic scan tool 15, the engine ECU 1 divides the response data corresponding to the respect into a plurality of frames. The total number TN of response data is set to a positive integer not less than 2.

As shown in FIG. 3, each of the frames comprises, for example, a string of bytes, and the data size of each frame is referred to as "DS".

The engine ECU 1 sends the divided frames at intervals in a predetermined order. In addition, if the total number TN of the response data exceeds the predetermined continuous transmitting frame number represented as FN, the engine ECU 1 interrupts transmitting of the frames during a period every time the FN frames are transmitted to the source of transmitting the request (at least one of the ECUs 2-6 or the diagnostic scan tool 15). The "continuous transmitting wait time (ft)" illustrated in FIG. 3 represents the constant period.

Particularly, if the total number TN of the response data exceeds the predetermined continuous transmitting frame number FN, the engine ECU 2 sends the first frame, the second frame, the third frame, . . . , and the FN-th frame to the source of transmitting the request at the intervals. After transmitting the FN-th frame to the source of transmitting the request, the engine ECU 1 waits the continuous transmitting wait time (ft). After the continuous transmitting wait time (ft) has elapsed, the engine ECU 1 starts to intermittently transmit the remaining frames (the FN+1-th frame, . . . ).

The interval from the reception of the request by the engine ECU 1 to the start of transmitting the first frame thereby is referred to as "first frame transmitting wait time" illustrated in FIG. 3. The intervals between the k+1 frame and the k frame (k=1, 2, . . . , FN, FN+1, . . . ) are referred to as "k+1 transmitting wait time". For example, the interval between the second frame and the first frame is referred to as "second frame transmitting wait time", and the interval between the third frame and the second frame is referred to as "third frame transmitting wait time". In particular, the interval from the end of the continuous transmitting wait time (ft) to the FN+1-th frame is referred to as "FN+1-th frame transmitting wait time".

Each transmitting wait time is represented as a parameter WT, and the parameter WT is variably settable. Similarly, each data size DS of each of the frames corresponding to the response data and the continuous transmitting frame number FN are variably settable, respectively.

Processes executed by the engine ECU 1 for transmitting the response data with respect to the request transmitted from at least one of the other ECUs 2-6 or the diagnostic scan tool 15 will be explained according to FIGS. 4-8.

Figure 4:
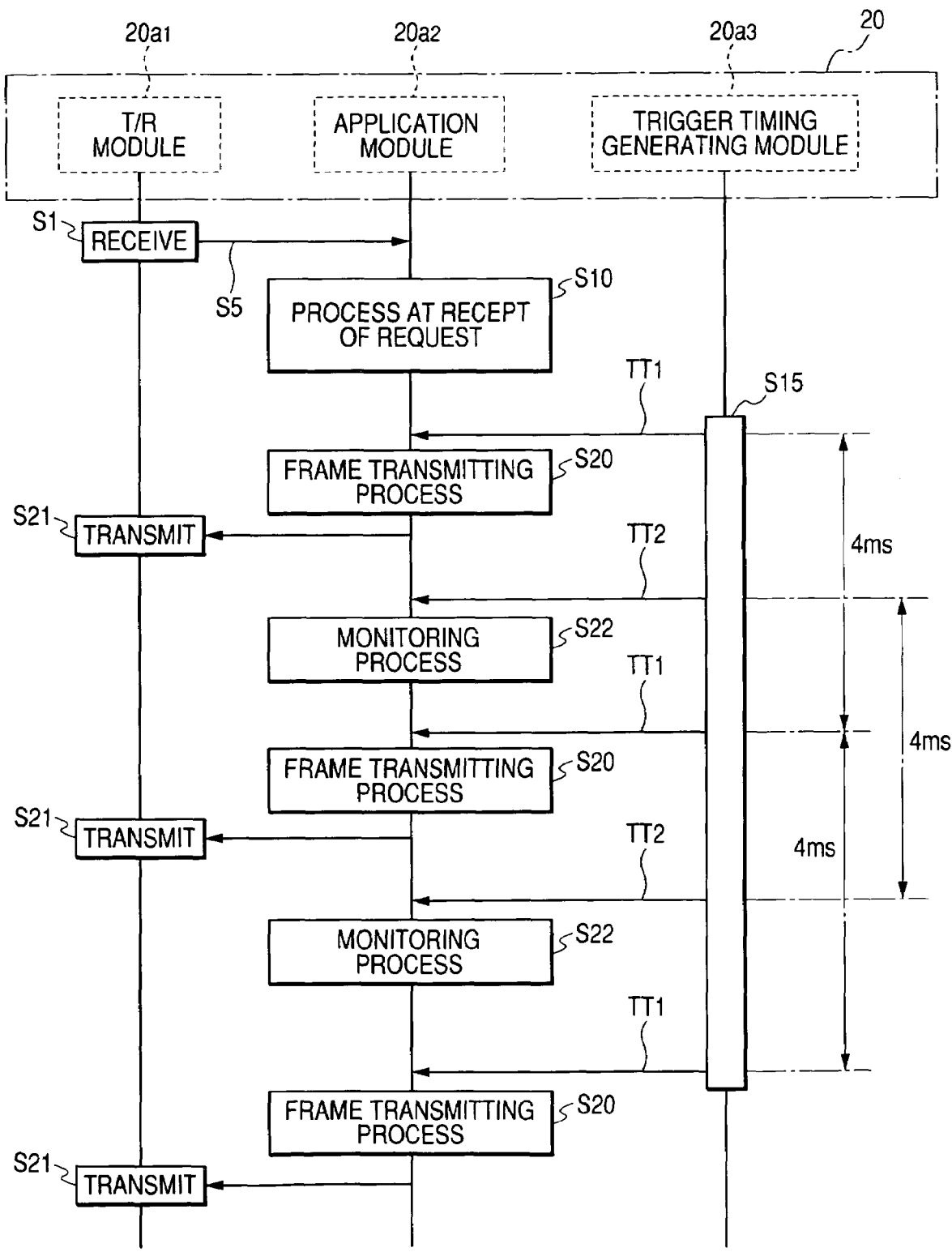
FIG. 4 is a flowchart schematically illustrating processes in response to the request transmitted from the other ECUs or the diagnostic scan tool according to the embodiment.

As shown in FIG. 4, the CPU 20 of the microcomputer 1a functionally has a transmitting/receiving (T/R) module 20a1, an application module 20a2, and a trigger-timing generating module 20a3, which are operatively coupled to each other. For example, these functional modules 20a1-20a3 of the CPU 20 correspond to program modules that are separated and combined with each other to form the program P. That is, the functional modules 20a1-20a3 of the CPU 20 are realized as the processes of the CPU 20 according to the program modules When receiving the request transmitted from at least one of the other ECUs 2-6 or the diagnostic scan tool 15 in step S1, the T/R module 20a1 of the CPU 20 provides a notification of receipt of the request to the application module 20a2 in step S5. The application module 20a2 executes the processes including a checking process of the information of the request and a communication-load reducing process at the receipt of the request in step S10 according to the steps shown in FIG. 5 described hereinafter.

The trigger-timing generating module 20a3 periodically generates first trigger timing signals TT1 at predetermined intervals of, for example, 4 ms (milliseconds). Similarly, the trigger-timing generating module 20a3 periodically generates second trigger timing signals TT2 at predetermined intervals of, for example, 4 ms to shift the generation timing of each first trigger timing signal TT1 and that of each second trigger signal TT2 at a predetermined interval in step S15.

In step S20, the application module 20a2 of the CPU 20 executes a frame transmitting process every time the first trigger timing signal TT1 is generated in step S15 so that, when the frames corresponding to the request are present, the application module 20a2 provides a transmitting request to the T/R module 20a1. The T/R module 20a1 of the CPU 20 transmits to the source of transmitting the request the frames one at a time in response to the transmitting request (step S21).

The application module 20a2 of the CPU 20 also performs a monitoring process of monitoring the processing load of the CPU 20 to control the engine EN and the traffic load in the communication line 8 coupled to the engine ECU 1 every time the second trigger timing signal TT2 is generated in step S15 (step S22).

Next, the processes at the reception of the request will be explained in detail in accordance with FIG. 5.

When receiving the request sent from at least one of the other ECUs 2-6 or the diagnostic scan tool 15, the CPU 20 of the microcomputer 1a starts to the processes at the reception of the request.

That is, the CPU 20 determines whether it is in the course of executing the response process with respect to the previous request. In other words, the CPU 20 determines whether it has completed all of the frames corresponding to the previous request in step S110.

If the CPU 20 determines that it is in the course of executing the response process with respect to the previous request, that is, the determination in step S110 is YES, the CPU 20 continues to step S120 to determine whether the previous request is one of the predetermined legal service requests.

It is noted that the legal service requests correspond to some of the various types of requests transmitted from the diagnostic scan tool 15. Each of the legal service requests is a specified request whose response time from the reception of the specified request to the start of transmitting of the response data corresponding thereto and whose time to complete the response data corresponding to the specified request have been prescribed by the laws, such as ISO 15031-5 or ISO 15765-4. High responsiveness with respect to each of the specified requests is required.

As an example of the specified requests, in this embodiment, the request to output the engine state data including at least one of the accelerator position, the throttle position, the engine speed, the engine revolutions, the cooling water temperature, and the battery voltage, which represent the state of the engine EN, is set as one of the specified requests. Similarly, the request to output data, such as diagnostic code, representing a result of the fault detection process by the engine ECU 1, that is, data representing a fault location is set as another one of the specified requests.

In step S120, the CPU 20 determines whether the previous request is one of the legal service requests according to the communication ID and the content identification code included in the information of the previous request.

Assuming that the communication ID of the previous request indicates the diagnostic scan tool 15, and the content identification code thereof indicates one of the contents of the legal service requests, the CPU 20 determines that the previous request is one of the legal service requests, that is, the determination in step S120 is YES. The CPU 20 shifts to step S130.

In step S130, the CPU 20 determines whether the present request is one of the legal service requests according to the communication ID and the content identification code included in the information of the present request as well as the process in step S120. If the CPU 20 determines that the present request is not one of the legal service requests, that is, the determination in step S130 is NO, then it shifts to step S140, canceling the process of responding to the present request and exiting the processes at the reception of the present request in step S140.

When the CPU 20 determines that the previous request is not one of the legal service requests, that is, the determination in step S120 is NO, or it determines that the present request is one of the legal service requests, that is, the determination in step S130 is YES, then the CPU 20 shifts to step S150. The CPU 20 cancels the process of responding to the previous request, in other words, transmitting the remaining frames corresponding to the previous request in step S150, continuing to step S160. On the other hand, when the CPU 20 determines that it is not in the course of executing the response process with respect to the previous request, in other words, that is, the determination in step S110 is NO, the CPU 20 shifts to step S160.

The CPU 20 sets the variable parameters of each frame to default values in step S160. In particular, the CPU 20 sets the transmitting wait time WT to 0 ms as the default value, and the data size DS of each frame to 8 bytes as the default value, and the continuous transmitting frame number FN to zero (0) as the default value. In this embodiment, the continuous transmitting frame number FN is set to zero (0) means the continuous transmitting frame number FN is infinitely large, that is, no limit is placed on the continuous transmitting frame number FN. In other words, no interruption of transmitting the frames is performed by the CPU 20 set forth above.

The CPU 20 determines whether the source of transmitting the present request is the diagnostic scan tool 15 in step S170, and when determining that the source of transmitting the present request is the diagnostic scan tool 15, that is, the determination in step S170 is YES, the CPU 20 shift to step S180. In particular, in step S170, if the communication ID included in the present request indicates the diagnostic scan tool 15, the CPU 20 determines that the source of transmitting the present request is the diagnostic scan tool 15.

Subsequently, the CPU 20 determines whether the information included in the present request represents one of the legal service requests according to the content identification code included in the present request in step S180. When determining that the information included in the present request represents one of the legal service requests, that is, the determination in step S180 is YES, the CPU 20 shifts to step S190.

In step S190, the CPU 20 sets the load reducing level of zero (0) to the level setting area 23d in the EEPROM 23, continuing to step S240 hereinafter. In this embodiment, the CPU 20 can set any one of a plurality of levels of reducing the process load required for transmitting the response data. The load reducing level set in the level setting area 23d expresses the set level of the plurality of levels of reducing the process load required for transmitting the response data.

That is, the load reducing level expresses that, the greater the number of load reducing level, the more reduced the responsiveness with respect to the request is. This allows the process load to transmit the response data to significantly decrease.

If the CPU 20 determines that the source of transmitting the present request is not the diagnostic scan tool 15 in step S170, that is, the determination in step S170 is NO, continuing to step S200. Similarly, if the CPU 20 determines that the information included in the present request does not represent one of the legal service requests in step S180, that is, the determination in step S180 is NO, continuing to step S200.

The requests causing the determination in step S180 to be NO include a request to forcefully drive at least one of the actuators AC1, a request to rewrite at least one piece of the control data stored in the control data storage area 23e of the EEPROM 23, and so on as examples.

In. step S200, the CPU 20 determines whether a process load required for controlling the engine EN as a control target device is heavy, in other words, high according to the engine state data detected by the sensors SE1 and the process load determining table T stored in the RAM 22. The process load required for controlling the engine EN is referred to as "engine-control process load" hereinafter.

The process load determining table T includes conditions for determining that the engine-control process load is heavy. The conditions include a first condition that the engine revolutions exceed the first predetermined number of, for example, 3000 rpm [revolutions per minute]. The conditions include a second condition that the engine revolutions exceed the second predetermined number of, for example, 5000 rpm, which is higher than the first predetermined number.

The conditions also include a third condition that the engine EN is started and a fourth condition that the gear ratio of the automatic transmission is changed. The conditions further include a fifth condition that the vehicle speed exceeds a predetermined speed of, for example, 1000 km/h (kilometer per hour), and a sixth condition that the vehicle V is under hard acceleration.

Reference values are previously set to these first to sixth conditions, respectively. That is, the reference value of "3" is set to the first condition, the reference value of "5" is set to the second condition, and the reference value of "5" is set to the third condition. Similarly, the reference value of "2" is set to the fourth condition, the reference value of "2" is set to the fifth condition, and the reference value of "3" is set to the sixth condition.

These first to sixth conditions and the reference values corresponding thereto are stored in the process load determining table T to be related to each other. The contents of the process load determining table T are conceptually illustrated in the following table 1.

TABLE 1

| TERM | CONTENT | REFERENCE VALUE |
|---|---|---|
| FIRST CONDITION | ENGINE REVOLUTIONS ARE 3000 rpm AND OVER | 3 |
| SECOND CONDITION | ENGINE REVOLUTIONS ARE 5000 rpm AND OVER | 5 |
| THIRD CONDITION | START OF ENGINE | 5 |
| FOURTH CONDITION | CHANGE OF GEAR RATIO | 2 |
| FIFTH CONDITION | VEHICLE SPEED IS 100 km/h AND OVER | 2 |
| SIXTH CONDITION | VEHICLE IS UNDER HARD ACCELERATION | 3 |

That is, the CPU 20 determines whether the current state of the vehicle V fits at least one of the first to sixth conditions according to the engine state data detected by the sensors SE1. If the CPU 20 determines the current state of the vehicle V fits into at least one of the first to sixth conditions, the CPU 20 calculates the sum of at least one of the reference values corresponding to at least one of the first to sixth conditions into which the current state of the vehicle V fits. Subsequently, the CPU 20 determines whether the sum of the reference values is not less than a predetermined threshold value of, for example, "5" and when determining that the sum of the reference values is not less than the predetermined threshold value, the CPU 20 determines that the engine-control process load is heavy in step S200, continuing to step S230.

That is, it is assumed that the current state of the vehicle V fits into the first condition and the fifth condition. At that time, the CPU 20 would calculate the sum of the reference value of "5" and the reference value "2" corresponding to the first and fifth conditions, and determine that the sum of the reference values, which is "7" is not less than the predetermined threshold value of "5" thereby determining that the engine-control process load is heavy.

Incidentally, the conditions for determining that the engine-control process load is heavy are not limited to the first to sixth conditions. For example, the number of control-processes, which are parallely executed by the engine ECU 1, in the various types of control processes related to the control of the engine EN may be applied to the conditions for determining that the engine-control process load is heavy.

When determining that the current state of the vehicle V does not fit into the first to sixth conditions, or that the sum of the reference values is less than the predetermined threshold value, the CPU 20 determines that the engine-control process load is not heavy in step S200, continuing to step S210.

The CPU 20 monitors the traffic load in the control communication line 8 by means of, for example, counting the number of frames flowing through the control communication line 8 within a predetermined constant period. When determining that the counted number of frames is not less than a predetermined threshold value, the CPU 20 determines that the monitored traffic load through the control communication line 8 is heavy, in other words, the traffic congestion is high in step S210.

If the CPU 20 determines that the traffic load through the control communication line 8 is not heavy in step S210 (the determination in step S210 is NO), the CPU 20 sets the load reducing level of one (1) to the level setting area 23d in the EEPROM 23 in step S220, continuing to step S240.

When determining that the engine-control process load is heavy in step S200 (the determination in step S200 is YES), or that the traffic load through the control communication line 8 is heavy in step S210 (the determination in step S210 is YES), the CPU 20 sets the load reducing level of two (2) to the level setting area 23d in the EEPROM 23 in step S230, continuing to step S240.

In step S240, the CPU 20 executes a communication process load reducing process according to any one of the set communication load reducing levels, which is explained in detail hereinafter by using FIG. 6, to determine the transmitting wait time WT of each frame, the data size DS of each frame, and the continuous transmitting frame number FN, respectively. The transmitting wait time WT of each frame, the data size DS of each frame, and the continuous transmitting frame number FN correspond to the response data with respect to the present request.

Subsequently, in step S250, the CPU 20 produces the response data composed of the frames illustrated in FIG. 3 according to the determined parameters WT, DS, and the FN to meet the present request. Furthermore, the CPU 20 loads the first frame into the TF storage area 22a as a transmitting frame in the RAM 22 to have the currently set data size DS in step S250, terminating the processes at the reception of the request.

The response data produced by the microcomputer 1a of the engine ECU 1 may include additional information, such as the communication ID of the engine ECU 1 and redundant codes for error detection in addition to the information to meet the present request. The additional information is based on the predetermined communication protocol, such as CAN.

Next, the communication process load reducing process will be explained in detail in accordance with FIG. 6.

That is, when starting the process in step S240, the CPU 20 of the microcomputer 1a sets the transmitting wait time WT according to the load reducing level that is currently set to the level setting area 23d in the EEPROM 23 and the communication ID included in the present request in step S310.

In particular, as shown as table TA in step S310, if the load reducing level is set to the level 0, that is, the present request is one of the legal service requests, the CPU 20 sets the transmitting wait time WT to 0 ms.

If the load reducing level is set to the level 1, when determining that the communication ID included in the present request corresponds to one of the ECUs 2-4, which are vehicle control system, or the diagnose scan tool 15, the CPU 20 sets the transmitting wait time WT to 20 ms in step S310.

If the load reducing level is set to the level 1, when determining that the communication ID included in the present request does not correspond to one of the ECUs 2-4 or the diagnose scan tool 15, the CPU 20 sets the transmitting wait time WT to a first predetermined time in step S310. The first predetermined time is longer than the 20 ms, such as 50 ms.

If the load reducing level is set to the level 2, when determining that the communication ID included in the present request corresponds to one of the ECUs 2-4 or the diagnose scan tool 15, the CPU 20 sets the transmitting wait time WT to the predetermined value of 50 ms in step S310.

If the load reducing level is set to the level 2, when determining that the communication ID included in the present request does not correspond to one of the ECUs 2-4 or the diagnose scan tool 15, the CPU 20 sets the transmitting wait time WT to a second predetermined time in step S310. The second predetermined time is longer than the 50 ms, such as 100 ms in step S310.

It is noted that the response time from the reception of each of the legal service requests whose load reducing levels are set to zero to the start of transmitting of the response data corresponding thereto has been prescribed within a predetermined period, such as 50 ms by the laws. This needs to transmit the response data corresponding to each of the legal service requests to the service scan tool 15 as fast as possible, whereby the transmitting wait time WT is set to 0 ms.

In contrast, as the requests except for the legal service requests are set to the predetermined times (20 ms, 50 ms, 100 ms) except for 0 ms by the CPU 20, which allows the process loads required for dealing with the requests except for the legal service requests to decrease.

In addition, it is noted that the speeds of the communication processes of devices connected to the multimedia communication line 9 and the body communication line 8, such as the navigation ECU 5 and the body ECU 6; are slower than those of the communication processes of devices connected to the control communication line 8, such as the ECUs 2-4. This allows the transmitting wait time WT set to each of the requests transmitted from the ECUs 2-4, to be longer than that set to each of the requests transmitted form the navigation ECU 5, which include at least one request transmitted from the vehicle information control center 11, or those transmitted from the body ECU 6.

Subsequently, the CPU 20 sets the data size DS per frame according to the load reducing level that is currently set to the level setting area 23d in the EEPROM 23 in step S320.

In particular, as shown as table TB in step S320, if the load reducing level is set to the level 0, the CPU 20 sets the data size DS to 8 bytes, which is equal to the default value in step S320. If the load reducing level is set to the level 1, the CPU 20 sets the data size DS to a first predetermined size, which is smaller than the default value of 8 bytes, such as 6 byres in step S320. When the load reducing level is set to the level 2, the CPU 20 sets the data size DS to a second predetermined size, which is smaller than the first predetermined size of 6 bytes, such as 4 byres in step S320.

In step S330, the CPU 20 sets the continuous transmitting frame number FN according to the load reducing level that is currently set to the level setting area 23d in the EEPROM 23.

Specifically, as shown as table TC in step S330, if the load reducing level is set to the level 0, the CPU 20 sets the continuous transmitting frame number FN to zero (0), which corresponds to infinity and is equal to the default value in step S330. If the load reducing level is set to the level 1, the CPU 20 sets the continuous transmitting frame number FN to a first predetermined natural number except for zero, such as 50 in step S330. When the load reducing level is set to the level 2, the CPU 20 sets the continuous transmitting frame number FN to a second predetermined natural number, which is smaller than the first predetermined natural number of 50, such as 25 in step S330.

It is noted that the time to complete the response data corresponding to each of the legal service requests whose load reducing levels are set to zero have been prescribed within a predetermined period by the laws. The data size DS of each of the response data corresponding to each of the legal service requests, therefore, is set to be large as much as possible, and the continuous transmitting frame number FN is set to zero, preventing the transmitting of the frames from being interrupted.

In contrast, the greater the load reducing level is, the more reduced the data size DS of each of the response data corresponding to requests except for the legal service requests is, and the continuous transmitting frame number FN is set to be a comparatively small value, except for zero. This configuration allows the process load for transmitting the response data corresponding to the requests except for the legal service requests to significantly decrease.

In step S340, the CPU 20 sets the current set value of the transmitting wait time WT to its first counter (transmitting interval counter) C1 as a count value "t". The first counter C1 is operative to count the wait time from the receiving of the present request to the start of transmitting the first frame, and the transmitting intervals between the respective frames. The first counter C1 is configured to be decremented by the process in step S600 of the CPU 20 during the monitoring process illustrated in FIG. 8 hereinafter. That is, the count value "t" of the first counter C1 is used to indicate the wait time WT.

Subsequently, the CPU 20 sets the default value of zero (0) to each of the second counter (continuous transmitting frame number counter) C2 and the third counter (continuous transmitting wait time counter) C3, respectively in step S350, continuing to step S250. The count value of the second counter C2 is referred to as "f", and that of the third counter C3 is referred to as "ft". The count value "f" of the second counter C2 is used to indicate the continuous transmitting frame number FN, and the count value "ft" of the third counter C3 is used to indicate the continuous transmitting wait time ft.

The second counter C2 is operative to count the number of frames that have already been transmitted, and configured to be incremented by the process in step S445 of the CPU 20 during the frame transmitting process illustrated in FIG. 7 hereinafter.

The third counter C3 is operative to count the continuous transmitting wait time ft that represents the period during which the CPU 20 interrupts transmitting of the frames every time the FN frames are transmitted to the source of transmitting the present request set forth above in FIG. 3. The third counter C3 is configured to be decremented by the process in step S610 of the CPU 20 during the monitoring process illustrated in FIG. 8 hereinafter.

Next, the frame transmitting process shown in step S21 will be explained in detail in accordance with FIG. 7.

When starting the frame transmitting process in response to each of the transmitting requests every 4 ms, the CPU 20 determines whether the transmitting frame corresponding to one frame of the response data is set to the TF storage area 22a in step S410.

If no transmitting frame is set to the TF storage area 22a, that is, the determination in step S410 is NO, the CPU 20 terminates the frame transmitting process.

If the transmitting frame is set to the TF storage area 22a, that is, the determination in step S410 is YES, the CPU 20 shifts to step S420 and determines whether the currently set continuous transmitting frame number FN is zero in step S420.

When determining that the continuous transmitting frame number FN is zero, that is, the determination in step S420 is YES, the CPU 20 shifts to step S430.

The CPU 20 determines whether the number set to the first counter C1 is zero in step S430.

When determining that the count value "t" set to the first counter C1 is not to zero, that is, the determination in step S430 is NO, the CPU 20 terminates the frame transmitting process.

When determining that the count value "t" set to the first counter C1 is zero, that is, the determination in step S430 is YES, the CPU 20 shifts to step S440, executing the process to transmit the transmitting frame stored in the TF storage area 22a. That is, in step S440, the CPU 20 generates the transmitting request.

The program module corresponding to the T/R module 20a1 is started in response to the generated transmitting request. In accordance with the program module, the CPU 20, as the function of the T/R module 20a1, reads out the transmitting frame stored in the TF storage area 22a to transmit the transmitting frame to the source of transmitting the present request in step S440.

Subsequently, the CPU 20 determines whether the currently set continuous transmitting frame number FN is zero again in step S443. If the CPU 20 determines that the continuous transmitting frame number FN is zero (the determination in step S443 is YES), the CPU 20 shifts to step S450. If the CPU 20 determines that the continuous transmitting frame number FN is not zero (the determination in step S443 is NO), the CPU 20 increments the count value f of the second counter C2 by 1, going to step S450.

The CPU 20 sets the transmitting wait time WT to the first counter C1 in step S450, and sets the following frame of the transmitted frame in step S440 to the TF storage area 22a in the RAM 22 to have the currently set data size DS in step S460, terminating the frame transmitting process.

On the other hand, if the CPU 20 determines that the currently set continuous transmitting frame number FN is not zero in step S420 (the determination in step S420 is NO), continuing to step S470.

The CPU 20 determines whether the count value "ft" set to the third counter C3 is zero in step S470, and when determining that the count value "ft" set to the third counter C3 is not zero (the determination in step S470 is NO), the CPU 20 ends the frame transmitting process. When determining that the count value "ft" set to the third counter C3 is zero (the determination in step S470 is YES), the CPU 20 determines whether the count value "f" set to the second counter C2 is less than the currently set continuous transmitting frame number FN in step S480. If the CPU 20 determines that the count value "f" set to the second counter C2 is less than the currently set continuous transmitting frame number FN in step S480 (the determination in step S480 is YES), continuing to step S430.

If the CPU 20 determines that the count value "f" set to the second counter C2 is not less than the currently set continuous transmitting frame number FN in step S480 (the determination in step S480 is NO, that is, "f"≧FN), the CPU 20 shifts to step S500, setting a constant continuous transmitting wait time, such as 75 ms, to the third counter C3. The CPU 20 sets the second counter C2 to zero in step S505, ending the frame transmitting process.

Next, the monitoring process shown in step S22 will be explained in detail in accordance with FIG. 8.

When starting the monitoring process in response to each of the trigger timing signals TT2 every 4 ms, the CPU 20 determines whether the transmitting frame corresponding to one frame of the response data is set to the TF storage area 22a in step S510, which is similar to the process of step S410.

If the CPU 20 determines that no transmitting frame is set to the TF storage area 22a in step S510 (the determination in step S510 is NO), terminating the monitoring process. When determining that the transmitting frame is set to the TF storage area 22a in step S510 (the determination in step S510 is YES), the CPU 20 shifts to step S520.

The CPU 20 determines whether the currently set load reducing level is zero, and when determining that the currently set load reducing level is zero (the determination in Step S520 is YES), the CPU 20 terminates the monitoring process. When determining that the currently set load reducing level is not zero (the determination in Step S520 is NO), the CPU 20 continues to step S530.

Figure 5:
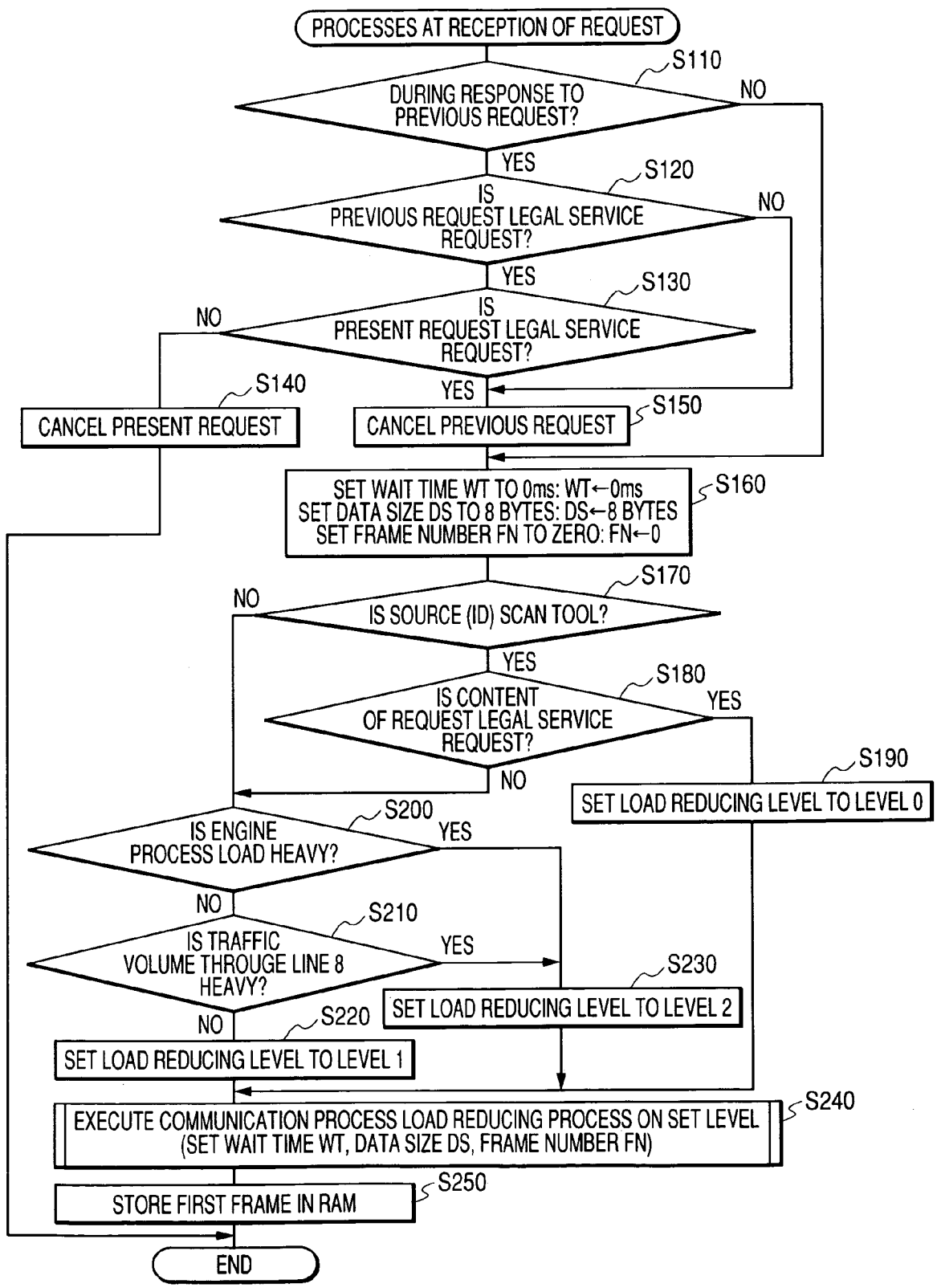
FIG. 5 is a flowchart schematically illustrating processes executed by the engine ECU at the reception of the request according to the embodiment.

In step S530, the CPU 20 determines whether the engine-control process load is heavy in a similar manner as shown in step S200 of FIG. 5.

If the CPU 20 determines that the engine-control process load is not heavy in step S530 (the determination in step S530 is NO), the CPU 20 monitors the traffic load in the control communication line 8. Subsequently, the CPU 20 determines whether the monitored traffic load through the control communication line 8 is heavy in step S540 in the similar manner shown in step S210 of FIG. 5.

When determining that the traffic load through the control communication line 8 is not heavy in step S540 (the determination in step S540 is NO), the CPU 20 continues to step S550 to set the load reducing level of 1 to the level setting area 23d in the EEPROM 23.

When determining that the engine-control process load is heavy in step S530 (the determination in step S530 is YES), or determining that the traffic load through the control communication line 8 is heavy in step S540 (the determination in step S540 is YES), the CPU 20 continues to step S560. In step S560, the CPU 20 sets the load reducing level of 2 to the level setting area 23d in the EEPROM 23.

That is, these processes in step S530 to 560 are substantially identical to those in step S200 to S230.

Figure 6:
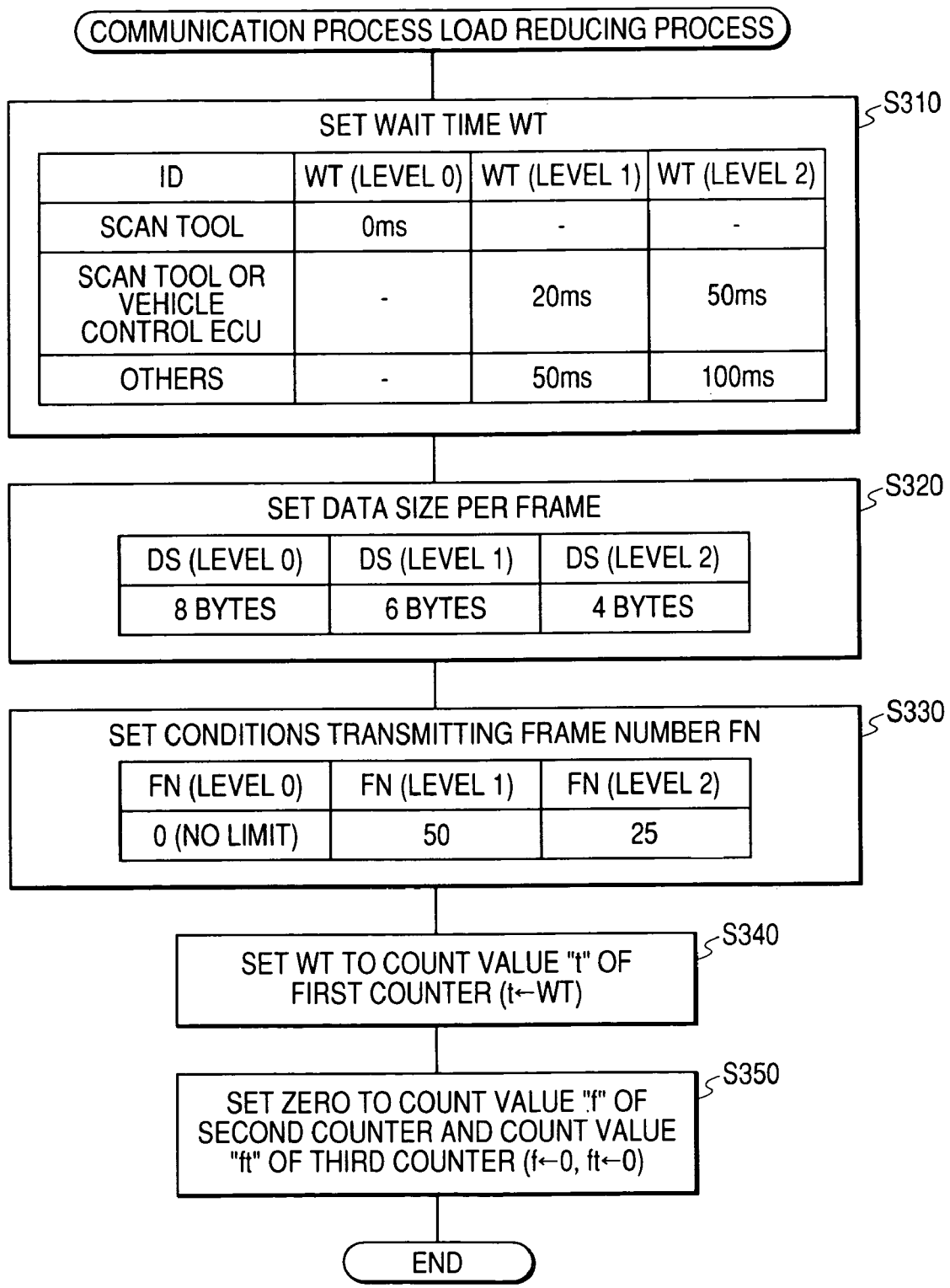
FIG. 6 is a flowchart schematically illustrating a communication load reducing process executed in step S240 by the engine ECU according to the embodiment.

In step S570, the CPU 20 executes a communication process load reducing process according to any one of the set communication load reducing levels, which is substantially similar to the process shown in FIG. 6. That is, the communication process load reducing process in step S570 omits steps S340 and 350 so that the remaining is substantially identical with the communication process load reducing process shown in steps S310 to S330 of FIG. 6.

In step S580, the CPU 20 determines whether the count value "ft" is zero, and when determining that the count value "ft" of the third counter C3 is zero (the determination in step S580 is YES), the CPU 20 continues to step S590 to determine whether the count value "t" of the first counter C1 is zero.

When determining that the count value "t" of the first counter C1 is zero (the determination in step S590 is YES), the CPU 20 terminates the monitoring process. When determining that the count value "t" of the first counter C1 is not zero (the determination in step S590 is NO), the CPU 20 continues to step S600 to decrement the count value "t" by a predetermined value corresponding to 4 ms, terminating the monitoring process.

On the other hand, when determining that the count value "ft" is not zero (the determination in step S580 is NO), the CPU 20 continues to step S610 to decrement the count value "ft" by a predetermined value corresponding to 4 ms, terminating the monitoring process.

As described above, when the engine ECU 1 according to this embodiment receives the present request transmitted from at least one of the other ECUs 2-6 or the diagnostic scan tool 15, the microprocessor 1a (CPU 20) of the engine ECU 1 executes the processes at the reception of the present request illustrated in FIG. 5.

During the processes in FIG. 5, when determining to response the present request, that is, when skipping the process in step S140 to continue to step S160, the currently set transmitting wait time WT is set to the count value "t" of the first counter C1. In other words, the count value "t=WT" is set to the first counter C1 (see step S340 in FIG. 6). Zero (0) is set to each of the count value "f" of the counter C2 and the count value "ft" of the counter C3 (see step S350 in FIG. 6). In addition, the first frame having the currently set data size DS of the response data with respect to the present request is stored in the TF storage area 22a in the RAM 22 (see step S250 in FIG. 5).

Figure 8:
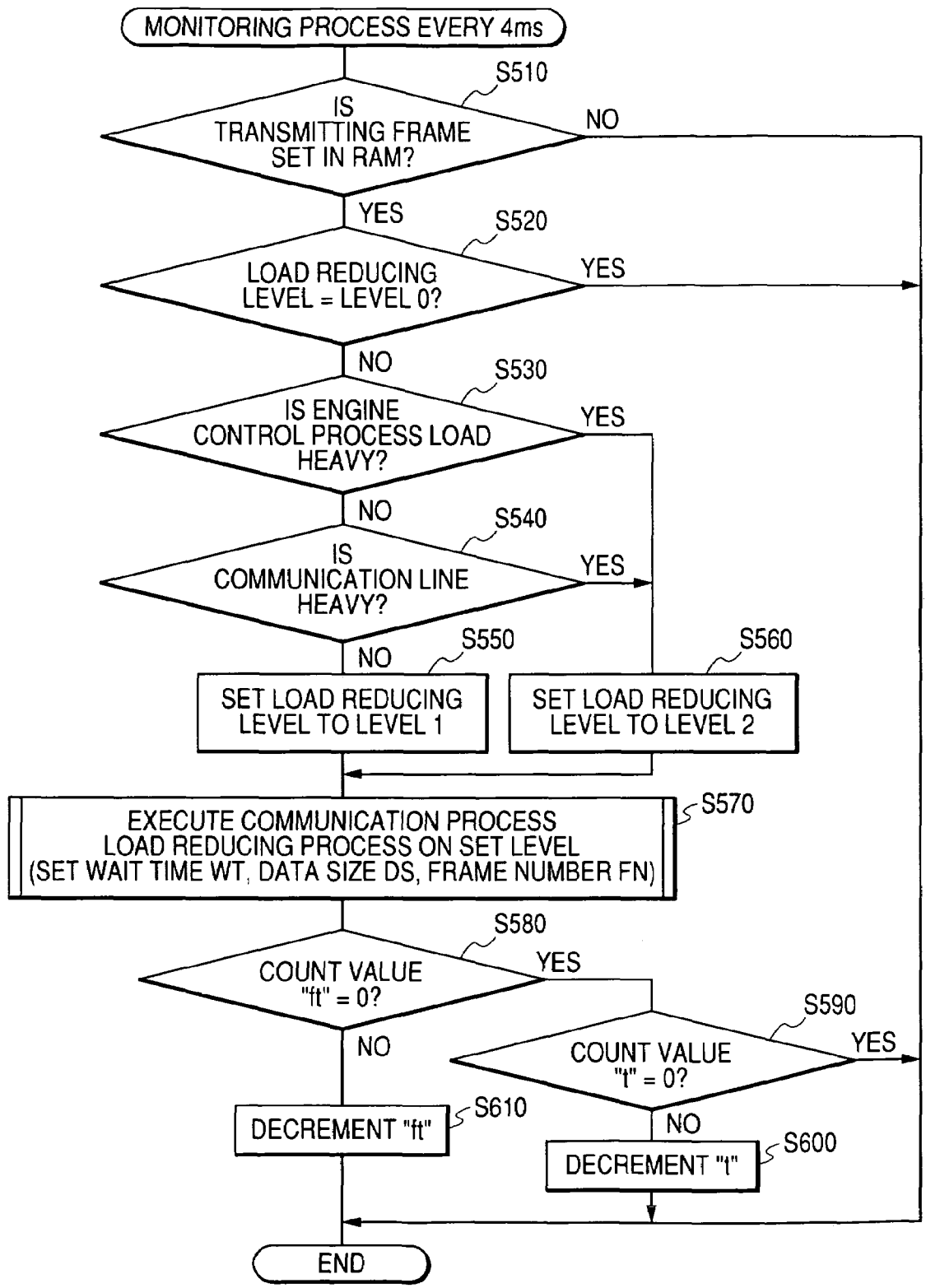
FIG. 8 is a flowchart schematically illustrating a monitoring process of engine process load and the communication line executed by the engine ECU.

Assuming that the continuous transmitting frame number FN is set to any one of values except for zero (0), in other words, the load reducing level is set to any one of levels except for the level zero (0), the determination in step S580 of FIG. 8 every 4 ms is YES. That is, because, when the present request is not one of the legal service requests, the load reducing level is set to one of the levels 1 and 2, the determination in step S580 of FIG. 8 every 4 ms is YES.

These affirmative determinations cause the decrement processes in steps S590 and S600 to decrement the count value "t=WT" of the first counter C1 up to zero.

Figure 7:
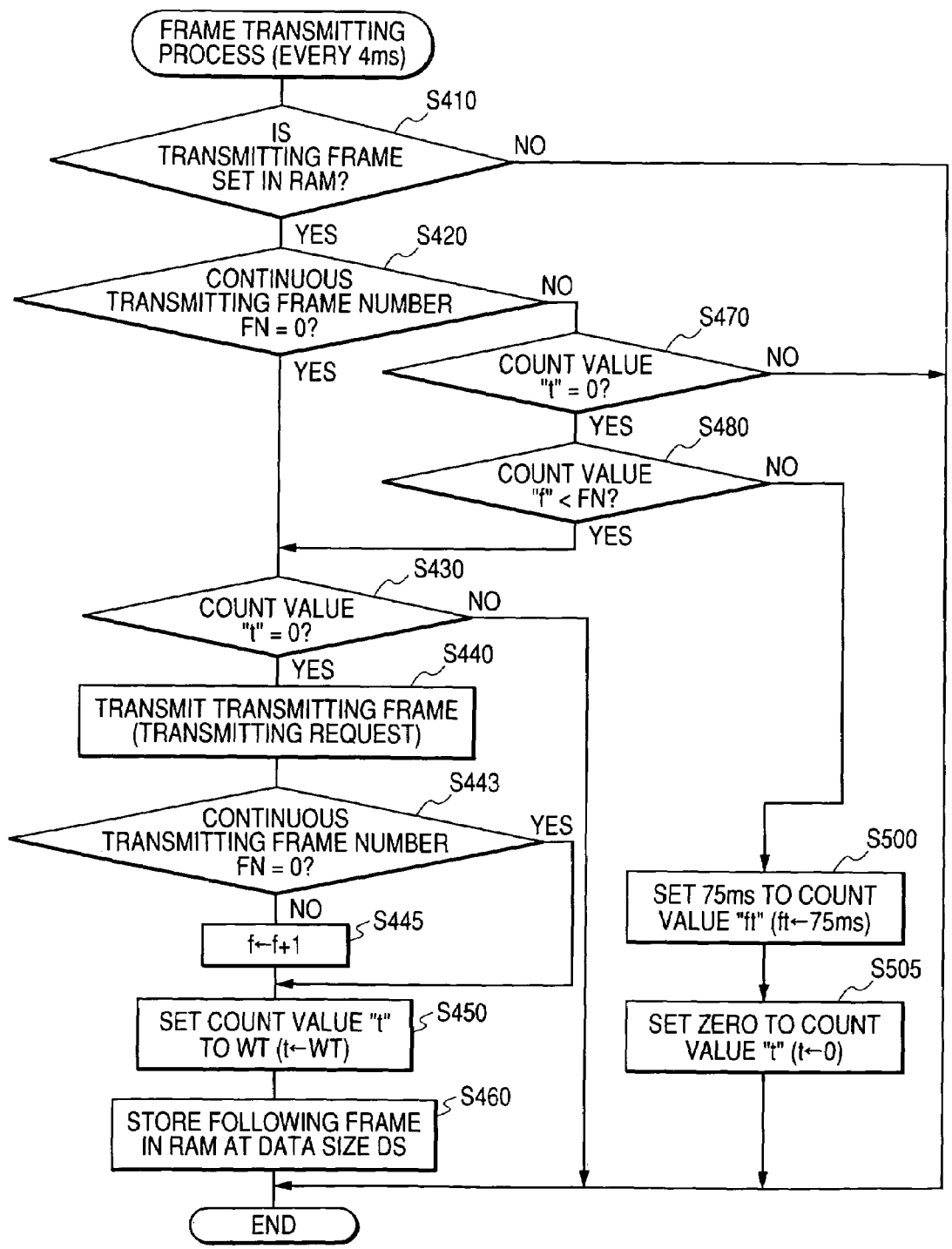
FIG. 7 is a flowchart schematically illustrating a frame transmitting process executed by the engine ECU.

In the processes shown in FIG. 7, the determination in step S410 is YES, the determination in step S420 is NO, the determination in step S470 is YES, and the determination in step S430 is YES.

Because the count value "t=WT" of the first counter C1 is decremented by the processes in steps S590 and S600 set forth above, when the count value "t=WT" of the first counter C1 is determined to become "0" the wait time WT has substantially elapsed since the present request is received by the CPU 20.

As a result, after the wait time WT has substantially elapsed since the present request is received by the CPU 20, the determination in step S430 is YES, so that the first frame stored in the TF storage area 22a in the RAM 22 is transmitted to the source of transmitting the present request.

Subsequently, in step S445, the count value "f" of the second counter C2 is incremented by 1.

Next, as preparation processes, the currently set transmitting wait time WT is set to the count value "t" of the first counter C1, and the currently set data size DS corresponding to the following frame of the transmitted frame is stored in the TF storage area 22a in the RAM 22 (see steps S450 and 460 in FIG. 7.

As described above, the first frame in the response data corresponding to the present request is transmitted to the source of transmitting the present request after the wait time WT has substantially elapsed since the receiving of the present request (see FIG. 3).

After transmitting the first frame, the processes in steps S590 and S600 of FIG. 7, the processes in steps S410, S420, S470, S480, and S430-460 of FIG. 7 are repeated so that the second frame to the FN-th frame are sequentially transmitted to the source of transmitting the present request every wait time WT.

When the FN-th frame is transmitted, the repeatedly transmitting processes from the first frame to the FN-th frame in step S430 to S460 increment the count value "f" of the second counter C2 becomes "FN".

In the following frame (FN+1-th frame) of the FN-th frame, therefore, the count value "f=FN" of the second counter C2 allows the determination in step S480 to be NO, so that the count value "ft" of the third counter C3 is set to the continuous transmitting wait time of 75 ms. In addition, the count value "f" of the second counter C2 is reset to zero (0) (see steps S500 and S505 of FIG. 7).

Then, in the processes of FIG. 8, the determination in step S580 is NO because of the count value "ft=75 ms" of the third counter C3, so that the decrement process in step S610 decrements the count value "ft=75 ms" of the second counter C2 up to zero.

During the repeated processes in step S610, in the processes shown in FIG. 7, the determination in step S410 is YES, the determination in step S420 is NO, and the determination in step S470 is NO, so that these steps S430-460 are skipped. This allows the transmitting of the following frame (FN+1-th frame) to be interrupted.

That is, after the FN-th frame is transmitted, the transmitting of the following frame (FN+1-th frame) is interrupted while the count value "ft" of the third counter C3 does not become zero (0).

That is, until the count value "ft=75 ms" becomes zero (0), that is, the continuous transmitting wait time ft has substantially elapsed since the transmitting of the FN-th frame, the transmitting of the following frame (FN+1-th frame) is interrupted (see FIG. 3).

After the count value "ft=75 ms" becomes zero (0), that is, the continuous transmitting wait time ft has substantially elapsed, the processes shown in FIG. 7 continue so that the determination in step S410 is YES, the determination in step S420 is NO, the determination in step S470 is YES, and the determination in step S430 is YES. Then, in the process in step S580, because the count value "ft" is zero, the determination in step S580 of FIG. 8 every 4 ms is YES.

These affirmative determinations cause the decrement processes in steps S590 and S600 to decrement the count value "t=WT" of the first counter C1 up to zero, set forth above.

As a result, after the continuous transmitting wait time ft and the transmitting wait time WT have elapsed, the FN+1-th frame is transmitted to the source of transmitting the present request according to the process in step S440 of FIG. 7 (see FIG. 3).

After the transmitting of the FN+1-th frame, the following frames of the FN+1-th frame are sequentially transmitted to the source of transmitting the present request every wait time WT.

The above processes are repeated so that the transmitting of each following frame is interrupted every time the number of FN frames is transmitted.

Incidentally, assuming that the total number of frames of the response data corresponding to the present request is not more than the continuous transmitting frame number FN, the transmitting of all frames of the response data has been completed before the determination in step S480 of FIG. 7. This prevents the transmitting of the following frames from being interrupted during the continuous transmitting wait time ft.

When the continuous transmitting frame number FN is set to zero, that is, the load reducing level is set to zero, the present request corresponds to one of the legal service requests, which is transmitted from the diagnostic scan tool 15.

In this case, the determination in step S420 of FIG. 7 is YES, so that the above steps S470, S480, S500, and S550 are skipped. This results in that the frames of the response data corresponding to the present request is sequentially transmitted to the source of transmitting the present request in the order of first, second, . . . , every time the determination in step S430 of FIG. 7 is YES.

Moreover, when the load reducing level is set to zero, the transmitting wait time WT is zero (0 ms) (see step S310), and the processes in step S530 and subsequent steps (S540, S550, . . . ) of FIG. 8 are skipped because the determination in step S520 of FIG. 8 is YES. This keeps the count value "t" of the first counter C1 at zero.

The set of the wait time WT at zero (0) ms and the keep of the count value "t" at zero set the wait time WT until the transmitting of the first frame to less than 4 ms. In addition, the set of the wait time WT at zero (0) ms and the keep of the count value "t" at zero allow the frames of the response data corresponding to the present request to be sequentially transmitted every 4 ms (see steps S430-S460 of FIG. 7).

That is, when the present request corresponds to one of the legal service requests, the frames of the response data corresponding to the present request are sequentially transmitted to the source of transmitting the present request, which is the diagnostic scan tool 15, every 4 ms.

As described above, in the engine ECU 1 according to this embodiment, the responsiveness against all of the requests transmitted from at least one of the other ECUs 2-6 or the diagnostic scan tool 15 are changeable according to the contents of the requests.

That is, the processes in steps S170-S240 of FIG. 5, and steps S310-S330 of FIG. 6, which are executed in step S240, allow the responsiveness with respect to at least one of the legal service requests to be higher than that with respect to other requests except for the legal service requests.

In particular, the engine ECU 1 receives at least one of the legal service requests from the diagnostic scan tool 15, that is, the load reducing level is set to any one of the level 1 and the level 2. At that time, the engine ECU 1 (microcomputer 1a) sets the wait time WT until the start of transmitting the first frame and every wait time WT determining intervals of all of the frames of the response data corresponding to at least one of the legal service requests to short values. The short values set to the wait times WT are shorter than those determining the intervals of the frames of the response data corresponding to at least one of the other requests (see step S310 of FIG. 6).

That is, the shorter the wait time WT until the start of transmitting the first frame is, the higher the responsiveness with respect to the request is. Therefore, the responsiveness with respect to at least one of the legal service requests is higher than that with respect to the other requests. In addition, the wait time WT of the frames corresponding to one of the other requests is longer than that of the frames corresponding to at least one of the legal service requests, which provides the process loads of transmitting the frames corresponding to one of the other requests with allowance. This configuration of changing the wait time WT until the start of transmitting the first frame is effective when the restriction that the transmitting of response data with respect to at least one of the legal service requests must be started within a predetermined period is imposed.

In addition, the shorter the intervals WT of the respective frames are, the shorter the time until all of frames of the response data are completely transmitted is. This allows the responsiveness with respect to the request to increase. Therefore, the responsiveness of at least one of the legal service requests is higher than that of at least one of the other requests.

Moreover, the time until all of the frames corresponding to at least one of the legal service requests are completely transmitted is shorter than that until all of the frames corresponding to at least one of the other requests. In at least one of the other requests, because the transmitting intervals per frame is longer, it is possible to reduce the process loads for transmitting the frames. This configuration of changing the intervals WT of the frames is effective when the restriction that the transmitting of response data with respect to at least one of the legal service requests must be started within a predetermined period is imposed.

Moreover, the engine ECU 1 sets the continuous transmitting frame number FN of the frames of the response data corresponding to at least one of the legal service requests to a large value, such as an infinitely large value. In other words, no limit is placed on the continuous transmitting frame number FN of the frames of the response data corresponding to at least one of the legal service according to this embodiment. The large value set to the continuous transmitting frame number FN is larger than that of the frames of the response data corresponding to at least one of the other requests (see step S330 of FIG. 6).

That is, the larger the continuous frame number FN of the respective frames are, the shorter the time until all of the frames of the response data are completely transmitted is. This permits the responsiveness with respect to the request to increase. Therefore, the responsiveness of at least one of the legal service requests is higher than that of the other requests. Moreover, the time until all of the frames of the frames corresponding to at least one of the legal service requests are completely transmitted is shorter than that until all of the frames corresponding to at least one of the other requests. In at least one of the other requests, because the transmitting intervals per frame is longer, it is possible to reduce the process loads for transmitting the frames. This configuration of changing the continuous frame number FN is effective when the restriction that the transmitting of response data with respect to at least one of the legal service requests must be started within a predetermined period is imposed.

In addition, the larger the data size DS of each frame of the response data is, the shorter the time until all of frames of the response data are completely transmitted is. This permits the responsiveness with respect to the request to increase. Therefore, the responsiveness of at least one of the legal service requests is higher than that of the other requests. Moreover, the time until all of the frames corresponding to at least one of the legal service requests are completely transmitted is shorter than that until all of frames of the frames corresponding to at least one of the other requests. In at least one of the other requests, because the data size DS of each frame is small, it is possible to reduce the process loads for transmitting the frames. This configuration of changing the data size DS is effective when the restriction that the transmitting of response data with respect to at least one of the legal service requests must be started within a predetermined period is imposed.

As described above, the above setting processes of the engine ECU 1 allow the responsiveness of the legal service requests to be kept high and the process loads of the microcomputer 1a to decrease.

That is, it is possible for the engine ECU 1 to transmit the response data with respect to at least one legal service request while keeping high responsiveness with respect thereto. In addition, it is possible to transmit the response data with respect to at least one of the other requests while reducing the responsiveness with respect thereto, which is lower than the responsiveness corresponding to the legal service request.

This allows the process loads required for the transmitting of the response data to decrease, thereby controlling trouble-freely the engine EN without using a high performance microcomputer.

In addition, the processes in steps S200-S240 of FIG. 5, steps S310-S330 of FIG. 6, and steps S520-S570 of FIG. 8 set the transmitting wait times WT corresponding to the response data with respect to at least one of the other requests as follows.

That is, these processes set the transmitting wait times WT to large values so that, the larger the engine control process loads are, the more reduced the responsiveness with respect to at least one of the other requests according to the engine control process loads.

Similarly, the setting of the transmitting wait times WT to the large values, permitting that, the larger the traffic load in the communication line 8 is, the more reduced the responsiveness with respect to at least one of the other requests according to the traffic load in the communication line 8.

Furthermore, the setting of the transmitting wait times WT to the large values makes it possible that, the slower the communication speed of the source of transmitting at least one of the other requests is, the more reduced the responsiveness with respect to at least one of the other requests according to the source thereof.

When responding to at least one of the other requests, the settings of the data size DS per frame and the continuous transmitting frame number FN to small values according to the engine control process loads and the traffic load in the communication line 8. This makes it possible that, the larger the engine control process loads are, the more reduced the responsiveness with respect to at least one of the other requests. This permits that, the larger the traffic load in the communication line 8 is, the more reduced the responsiveness with respect to at least one of the other requests.

In particular, the processes in steps S520 to S570 of FIG. 8 are executed every 4 ms. This allows, even if each frame of the response data is being transmitted, the transmitting wait times WT corresponding to the intervals of the frames, the data size DS of each frame, and the continuous transmitting frames FN to be changed according to the engine control process loads and the traffic load of the communication line 8.

As a result, it is possible to appropriately reduce the process loads required for transmitting the response data to meet the current state of the vehicle V, thereby more reliably preventing troubles of the engine control from occurring. In addition, it is possible to prevent the traffic load in the communication line 8 from being excessive.

Moreover, it is assumed that the engine ECU 1 according to this embodiment receives another request while responding to a given request, that is, the determination in step S110 is YES. In this case, the engine ECU 1 determines whether the request is one of the legal service requests and whether the presently received request is one of the legal service requests (see steps S120 and S130 of FIG. 5).

When determining that the request, which is currently being responded, is one of the legal service requests and the presently received request is not one of the legal service requests, that is, the determinations in step S120 is YES, but the determination in step S130 is NO, the engine ECU 1 cancels the process of responding to the presently received request (see step S140).

In contrast, when determining that the request, which is currently being responded, is not one of the legal service requests and the presently received request is one of the legal service requests (the determinations in step S120 is NO, but the determination in step S130 is YES), the engine ECU 1 cancels the process of transmitting the remaining frames corresponding to the request being currently responded (see step S150).

This makes it possible to reliably respond to at least one of the legal service requests, which have priorities than the other requests, without needlessly increasing process loads for transmitting the response data.

Moreover, if all of the requests transmitted from the diagnostic scan tool 15 are set to the legal service requests, focusing only the identification ID makes it possible to easily determine whether the received request is one of the legal service requests. It is assumed that the diagnostic scan tool 15 and at least one of the other ECUs 2-6 transmit the same requests corresponding to the legal service requests, but the requests transmitted from the diagnostic scan tool 15 only correspond to the legal service requests. In this case, focusing both of the identification ID and the content identification code makes it possible to easily determine whether the received request is one of the legal service requests.

Incidentally, the processes in step S1 of FIG. 4, steps S120, S130, S170, and S180 of FIG. 5, which are executed by the microcomputer 1a, substantially correspond to a determining unit in this embodiment. The processes in steps S190-S240 of FIG. 5, S310-S330 of FIG. 6 included in step S240, and steps S520-S570 of FIG. 8, which are executed by the microcomputer 1a, substantially correspond to a changing unit in this embodiment. In addition, the processes in steps S410 to S460 of FIG. 7, which are performed by the microcomputer 1a, substantially correspond to a transmitting unit in this embodiment.

In addition, the process in step S140 of FIG. 5 substantially corresponds to a canceling unit in this embodiment. The processes in step S1, steps S170 and S180 executed by the microcomputer 1a substantially correspond to an identifying unit in this embodiment, and the process in step S200 of the microcomputer 1a substantially corresponds to a load detecting unit in this embodiment. The process in step S210 of the microcomputer 1a substantially corresponds to a monitoring unit in this embodiment, and the processes in steps S190, S220-S240, and S310-S330, which are performed by the microcomputer 1a, substantially correspond to a load reducing unit in this embodiment.

The above embodiment of the present invention has been described in detail, but the present invention is not limited to the embodiment to be applied to various types of modifications.

In this embodiment, when responding to at least one of the other requests except for the legal service requests, the load reducing level is set to one of the level 1 and the level 2, thereby reducing the responsibility with respect to at least one of the other requests, as compared with the legal service requests. These processes of this embodiment may be modified as a first modification and a second modification.

[First Modification]

Figure 9:
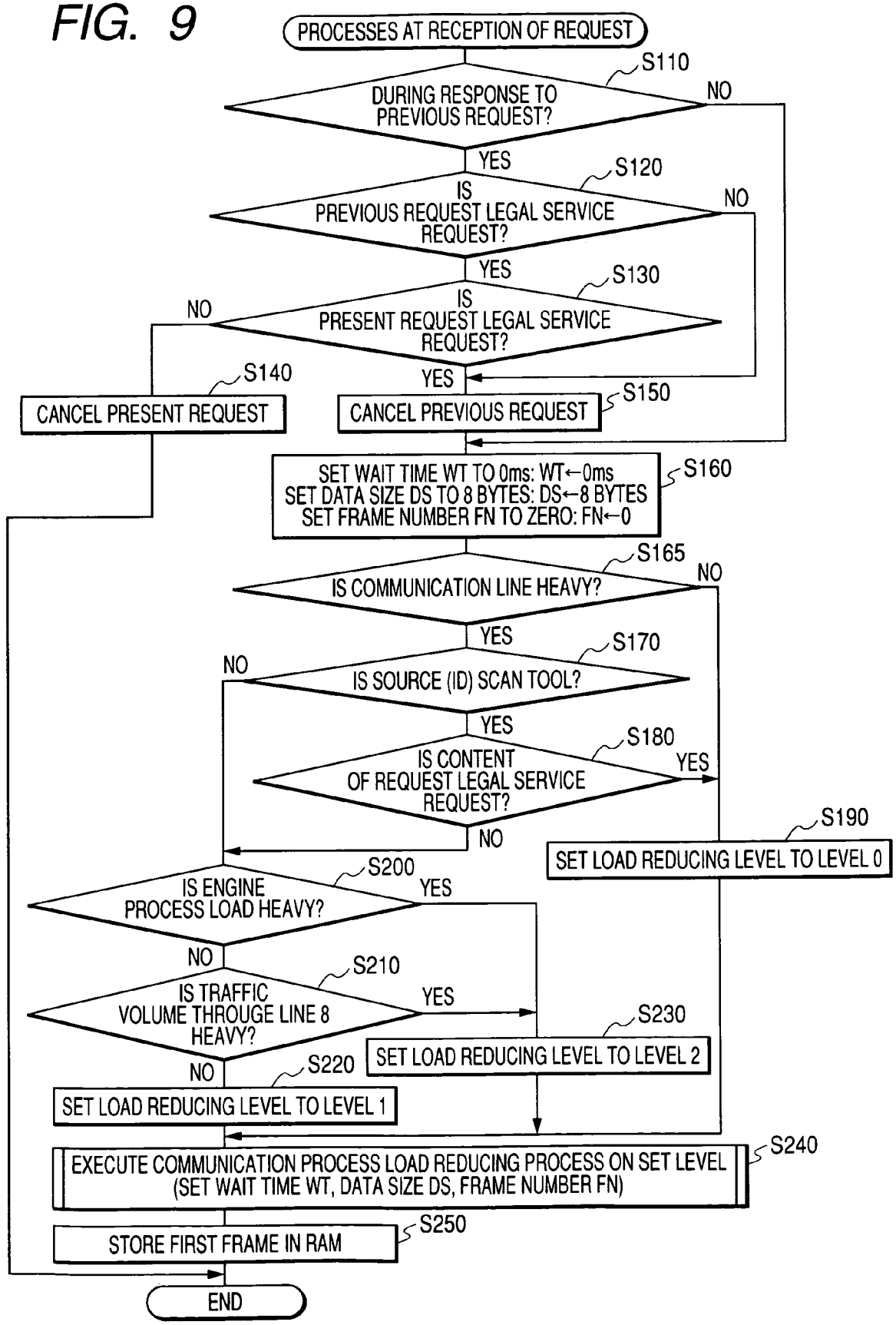
FIG. 9 is a flowchart schematically illustrating processes executed by the engine ECU according to a first modification of the embodiment

According to the first modification, the CPU 20 (the microcomputer 1a) executes the processes at the reception of the request illustrated in FIG. 9, in place of those illustrated in FIG. 5.

In the processes at the reception of the request illustrated in FIG. 9, a process in step S165 is added between steps S160 and S170.

In particular, after the process in step S160, the CPU 20 continues to step S160 to determine that the monitored traffic load through the control communication line 8 is heavy in step S165.

As described above, the CPU 20 monitors the traffic load in the control communication line 8 by means of, for example, counting the number of frames flowing through the control communication line 8 within the predetermined constant period. When determining that the counted number of frames is not less than a predetermined threshold value, such as a first threshold value N1, the CPU 20 determines that the monitored traffic load through the control communication line 8 is heavy in step S165.

If the CPU 20 determines that the traffic load through the control communication line 8 is heavy in step S165 (the determination in step S165 is YES), the CPU 20 continues to step S170.

If the CPU 20 determines that the traffic load through the control communication line 8 is not heavy in step S165 (the determination in step S165 is NO), the CPU 20 skips the processes in steps S170 and S180 shifts to step S190, setting the load reducing level to zero.

Other structures and operations are substantially identical with those of the embodiment.

That is, the first modification is based on the concept that, when the traffic load through the control communication line 8 is not heavy, it is unnecessary to reduce the communication loads.

In particular, when receiving the present request, the traffic load through the control communication line 8 is determined (see step S165), and whether the present request is one of the legal service requests as the specified requests is determined only when the traffic load through the control communication line 8 is heavy (see steps S170 and S180). The responsibility with respect to the present request is differentiated according the determination results in steps S170 and S180.

Specifically, when the traffic load through the control communication line 8 is not heavy (the determination in step S165 is NO), the load reducing level is uniformly set to zero (level zero) independently of the legal service request or the other request as the present request (see step S190). This allows the other requests except for the legal service requests to be transmitted while keeping the responsibilities that are substantially identical with those of the legal service requests.

The first modification permits the responsibilities of all pieces of the response data to be kept high when the communication line 8 is not heavy, thereby transmitting all pieces of the response data corresponding to all of the requests at the high responsibilities. As a result, it is possible to improve the controllability of each of the ECUs 2-6 and the diagnostic scan tool 15 communicably coupled to the communication line 8.

In this first modification, it is preferable that, in step S210 of FIG. 9, the CPU 20 determines whether the counted number of frames is not less than a second threshold value N2 larger than the first threshold value N1. Moreover, it is preferable that, when determining that the counted number of frames is not less than a second threshold value N2 in step S210, the CPU 20 determines that the monitored traffic load through the control communication line 8 is heavy in step S210. That is, in the first modification shown in FIG. 9, the CPU 20 continues to step S210 only when the counted number of frames is not less than the first threshold value N1. This makes it possible to set the load reducing level to the level 1 or the level 2 according to whether the counted number of frames is not less than the second threshold value N2.

[Second Modification]

Figure 10:
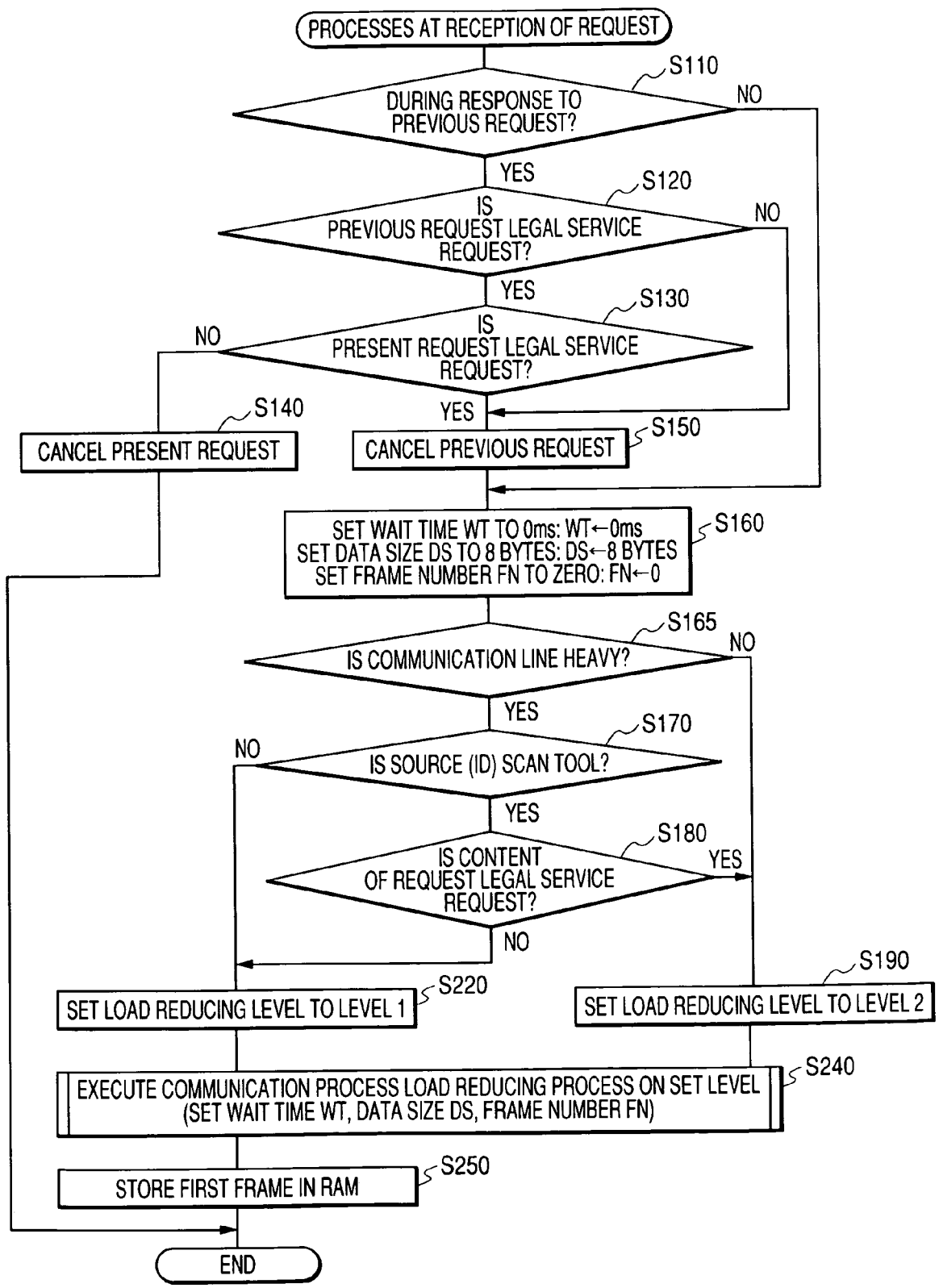
FIG. 10 is a flowchart schematically illustrating processes executed by the engine ECU according to a second modification of the embodiment.

According to the second modification, the CPU 20 (the microcomputer 1a) executes the processes at the reception of the request illustrated in FIG. 10, in place of those illustrated in FIG. 9.

In the processes at the reception of the request illustrated in FIG. 10, processes in steps S200, S210, and S230 are omitted as compared with the processes shown in FIG. 9.

That is, as well as the first modification, if the CPU 20 determines that the traffic load through the control communication line 8 is not heavy in step S165 (the determination in step S165 is NO), the CPU 20 skips the processes in steps S170 and S180, shifting to step S190 and setting the load reducing level to zero.

If the CPU 20 determines that the traffic load through the control communication line 8 is heavy in step S1165 (the determination in step S165 is YES), the CPU 20 continues to step S170.

The CPU 20 determines whether the source of transmitting the present request is the diagnostic scan tool 15 in step S170, and when determining that the source of transmitting the present request is the diagnostic scan tool 15 (the determination in step S170 is YES), the CPU 20 shift to step S180.

In step S180, the CPU 20 determines whether the information included in the present request represents one of the legal service requests according to the content identification code included in the present request. When determining that the information included in the present request represents one of the legal service requests, that is, the determination in step S180 is YES, the CPU 20 shifts to step S190, setting the load reducing level of zero (0) to the level setting area 23d in the EEPROM 23.

In contrast, when determining that the source of transmitting the present request is not the diagnostic scan tool 15 in step S170 (the determination in step S170 is NO), or when determining that the information included in the present request does not represent one of the legal service requests in step S180 (the determination in step S180 is NO), the CPU 20 continues to step S220. The CPU 20 sets the load reducing level of 1 to the level setting area 23d in the EEPROM 23 in step S220.

That is, according to the second modification, when receiving the present request, the traffic load through the control communication line 8 is determined (see step S165). Subsequently, whether the present request is one of the legal service requests as the specified requests is determined only when the traffic load through the control communication line 8 is heavy (see steps S170 and S180). The responsibility with respect to the present request is differentiated according the determination results in steps S170 and S180.

Specifically, when the traffic load through the control communication line 8 is not heavy (the determination in step S165 is NO), or the present request is one of the legal service request while the control communication line 8 is heavy (the determination in step S180 is YES), the load reducing level is set to zero. When the traffic load through the control communication line 8 is heavy and the present request is not one of the legal service request (the determination in step S170 is NO or that in step S180 is NO), the load reducing level is set to 1 (level 1). This allows the load reducing level to be set to only one the level zero (0) or the level one (1).

The second modification, as well as the first modification, enables the responsibilities of all pieces of the response data to be kept high when the communication line 8 is not heavy, thereby transmitting all pieces of the response data corresponding to all of the requests at the high responsibilities. As a result, it is possible to improve the controllability of each of the ECUs 2-6 and the diagnostic scan tool 15 communicably coupled to the communication line 8.

In this second modification, the load reducing level is set to one of the level 0 and the level 1. In the present invention, however, the monitored traffic load (traffic congestion) in the communication line 8 may be represented as a plurality of, such as high, middle, and low levels within the range over the congestion level at which the traffic load is determined to be heavy in step S165.

That is, in step S220, the load reducing level is set to any one of a plurality of levels, such as level 2, level 1, and level 0, which correspond to the high, middle, and low levels of the congestion volume, respectively. The second modification is substantially identical with the structure of the first modification illustrated in FIG. 9 except for the processes in steps S200 and S210.

The process in step S165 in the first and second modifications corresponds to a traffic load determining unit (process), and the processes in step S1, and steps S170 and S180 correspond to a request determining unit (process).

The embodiment and the first and second modifications of the present invention represent the traffic load in the communication line 8 as the number of frames flowing through the communication line 8 within the predetermined constant period. Physical value indicative of the volume of data flowing through the communication line 8 within the predetermined constant period may be applied to represent the traffic load in the communication line 8. For example, the number of bits (bytes) flowing through the communication line 8 within the predetermined constant period may be applied to represent the traffic load in the communication line 8.

The embodiment and the first and second modifications of the present invention are configured to determine the wait time from the receiving of the present request to the start of transmitting the first frame (response data), and the transmitting intervals between the respective frames as the common parameters of wait time WT. The wait time from the receiving of the present request to the start of transmitting the first frame and each of the transmitting intervals between the respective frames may be individually set by different variable parameters.

The embodiment and each modification of the present invention are configured to change the parameters: the wait time from the receiving of the present request to the start of transmitting the first frame; the transmitting intervals between the respective frames; the data size DS per frame; and the continuous transmitting frame number FN. These parameters determine a way of transmitting the response data.

The embodiment and each modification of the present invention may be configured to change at least one of the parameters. In addition, the embodiment and each modification of the present invention may be configured to change another parameter, such as the continuous transmitting wait time.

When responding to the legal service request, the embodiment and each modification of the present invention may be configured to change at least one of the parameters according to at least one the control process loads and the traffic load in the communication line 8.

In the embodiment and each modification of the present invention, at least one of various types of requests, such as the request to output the engine state data and the request to output data representing a result of the fault detection process by the engine ECU 1, are included in the legal service requests. The response time of each of the legal service requests from the reception of the legal service requests to the start of transmitting of the response data corresponding thereto, and the time thereof to complete the response data corresponding to each of the legal service requests have been prescribed by the laws.

In particular, in the embodiment and each modification of the present invention, the engine ECU 1 makes a response with respect to at least one of the legal service requests transmitted from the diagnostic scan tool 15.

Figure 11:
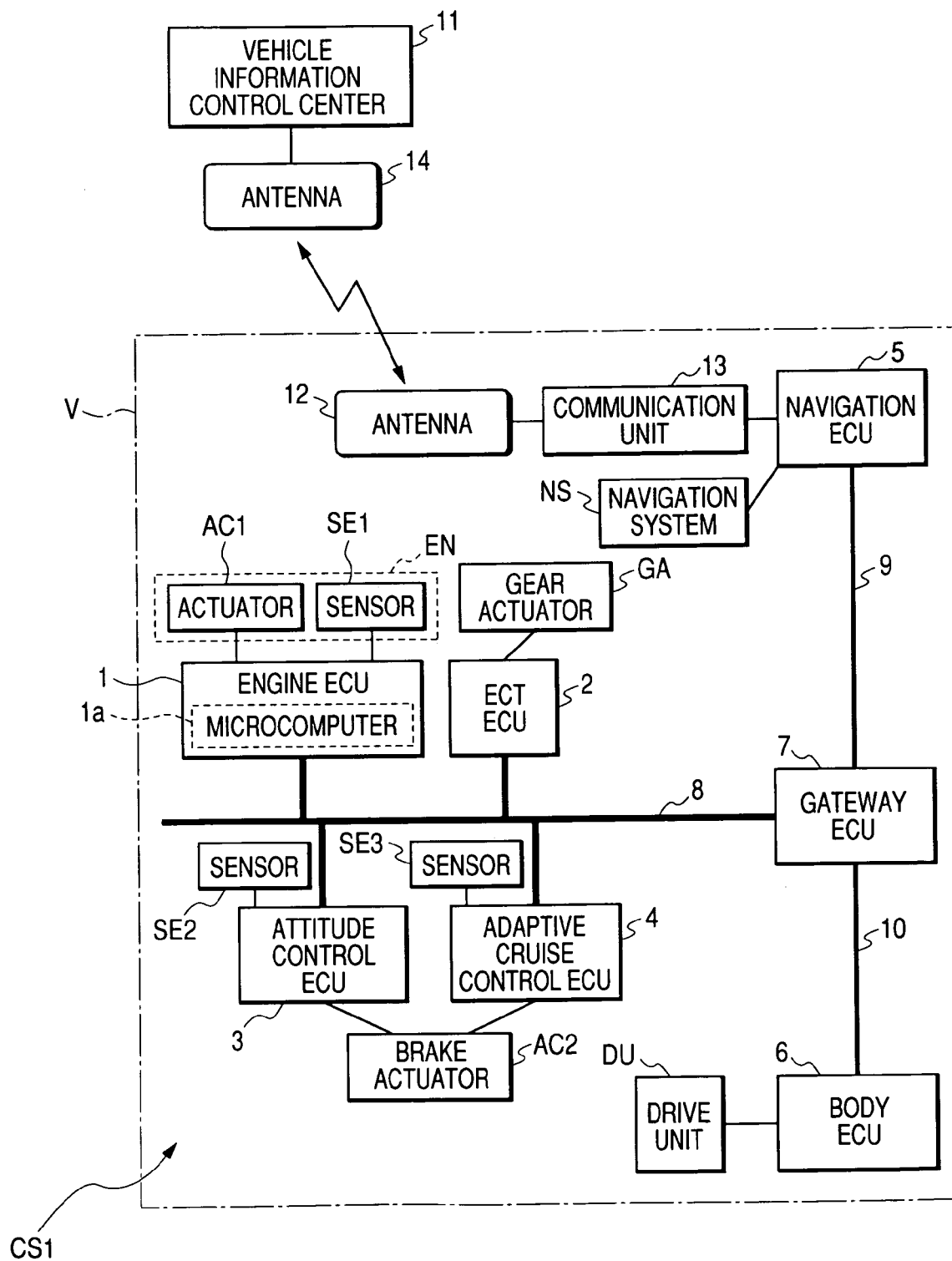
FIG. 11 is a schematic block diagram of another modification of the embodiment.

Another modification of the embodiment and each modification of the present invention, a vehicle control system CS1 may be configured to receive at least one of the legal service requests transmitted from the exterior of the vehicle V, such as from the vehicle information control center 11, as shown in FIG. 11.

As shown in FIG. 11, the engine ECU 1 of the vehicle control system CS1 accesses the vehicle information control center 11 by wireless through the antennas 12 and 14. This wireless communications between the engine ECU 1 and the control center 11 allow at least one of the legal service requests to be received through the gateway ECU and so on. In addition, this wireless communications between the engine ECU 1 and the control center 11 allow the response data corresponding to at least one of the legal service requests to be transmitted through the gateway ECU and so on to the control center 11.

In particular, the requests transmitted from the vehicle information control center 11 through the antenna 14 by wireless are received by the navigation ECU 5 through the antenna 12 and the communication unit 13. The navigation ECU 5 adds the communication ID of the vehicle information control center 11 and the content identification code indicative of the content of each of the requests to each of the requests. The navigation ECU 5 transmits the requests to each of which the communication ID and the content identification ID are added through the communication line 9 and the gateway ECU 7 to the address of the engine ECU 1.

The requests transmitted from the vehicle information control center 11 are transmitted through the communication line 9, the gateway ECU 7, and the communication line 8 to the engine ECU 1 so that the engine ECU 1 receives the transmitted requests. That is, the navigation ECU 5 separates the requests transmitted from the control center 11 from another request that the navigation ECU 5 itself transmits to transmit the separated requests transmitted from the control center 11.

In this case, the microcomputer 1*a* (CPU 20) of the engine ECU 1 may execute the above processes illustrated in FIGS. 5-10 by substituting the diagnostic scan tool 15 with the vehicle information control center 11 in the processes.

The response data with respect to each of the requests transmitted from the control center 11 may be transmitted from the engine ECU 1 and transmitted through the communication line 8 to the gateway ECU 7. The response data is transmitted from the gateway ECU 7 through the communication line 9, the navigation ECU 5, the antenna 12, the communication unit 13, and the antenna 14 to the vehicle information control center 11. In particular, the transmitting between the antennas 12 and 14 is executed by wireless.

On the other hand, the present invention may be applied to at least one of the other ECUs 2-6 in the substantially same manner as the engine ECU 1.

Incidentally, these steps (processes) shown in FIGS. 4-10 are performed by the engine ECU 1, but they may be performed by the combinations of ECUs 1-6. The vehicle control system CS 1 according to the embodiment or each of the modifications may be configured by a plurality of hard-wired logic circuits that perform the processes illustrated in FIGS. 5-10 in place of the engine ECU 1.

Furthermore, in this embodiment and each of the modifications, the microcomputer 1*a* (CPU 20) performs the processes according to the program P previously installed in the ROM 21. A computer-readable medium, such as the RAM, a CD (Compact Disk)-ROM, a semiconductor memory and so on may be applied to store the program P in place of the ROM 21.

While the above description is what is at present considered to be the embodiment and modifications of the present invention, it will be understood that various modifications which are not described yet may be made therein, and it is intended to cover in the appended claims all such modifications as fall within the true spirit and scope of the invention.

What is claimed is:

1. A control apparatus communicably coupled through an in-vehicle communication line to at least one device for controlling an equipment unit installed in a vehicle, said control apparatus comprising:
   a determining unit configured to receive a request transmitted from the at least one device, said determining unit being configured to determine whether the received request corresponds to a previously specified request; and
   a changing unit configured to change a mode of transmitting response data with respect to the received request according to a result of the determination by the determining unit such that a first responsiveness with respect to the received request corresponding to the specified request increases as compared with a second responsiveness with respect to the received request that does not correspond to the specified request.

2. A control apparatus according to claim 1, wherein said changing unit is configured to detect a device process load required to control an associated equipment unit and to change the mode of transmitting the response data according to the detected process load.

3. A control apparatus according to claim 1, wherein said changing unit is configured to monitor a traffic load in the in-vehicle communication line and to change the mode of transmitting the response data according to the monitored traffic load.

4. A control apparatus according to claim 1, wherein said changing unit is configured to change, as the mode of transmitting the response data, a wait time elapsed between receiving the request and starting transmission of the response data.

5. A control apparatus according to claim 1, further comprising a transmitting unit configured to divide the response data into a plurality of frames and to transmit the frames at intervals, and wherein said changing unit is configured to change, as the mode of transmitting the response data, the intervals between transmission of the frames.

6. A control apparatus according to claim 1, further comprising:
   a transmitting unit configured to divide the response data into a plurality of frames and to transmit the frames at intervals, said frames respectively having individually variable data sizes, and
   wherein said changing unit is configured to change, as the mode of transmitting the response data, the data size of at least one of the frames.

7. A control apparatus according to claim 1, further comprising:
   a transmitting unit configured to divide the response data into a plurality of frames and to transmit the frames at intervals, said transmitting unit being configured to interrupt the transmitting of the frames for a predetermined period every time a predetermined number of the frames are transmitted, and
   wherein said changing unit is configured to change, as the mode of transmitting the response data, the predetermined number of the frames.

8. A control apparatus according to claim 1, wherein, when another request transmitted from the at least one device is received by the determining unit before the response data has been completed, further comprising:
   a canceling unit configured to cancel a response of said another request when the determining unit determines that said another request does not correspond to the previously specified request.

9. A control apparatus according to claim 1, wherein:
   a plurality of the devices are present and the request is transmitted from any one of the plurality of devices,
   said request includes (a) source information indicative of which one of the devices was the source transmitting the request, and (b) identification information indicative of the request content, and
   said determining unit is configured to determine whether the received request corresponds to the previously specified request according to at least one of (a) the source information and (b) the identification information.

10. A control apparatus according to claim 1, further comprising:
    a traffic load determining unit configured to monitor a traffic load in the in-vehicle communication line and to determine if the monitored traffic load exceeds a predetermined threshold level,
    wherein said determining unit starts to determine whether the received request corresponds to the previously specified request when the traffic load determining unit determines that the monitored traffic load exceeds the predetermined threshold level, and
    wherein said changing unit starts to change the mode of transmitting the response data when the traffic load determining unit determines that the monitored traffic load exceeds the predetermined threshold level.

11. A control apparatus according to claim 1, wherein said at least one device is a diagnostic device for transmitting the previously specified request as the request.

12. A control apparatus according to claim 1, wherein said at least one device is located exterior of the vehicle and communicably coupled to the in-vehicle communication line.

13. A control apparatus according to claim 1, wherein said equipment unit is an engine.

14. A control apparatus according to claim 1, wherein:
    the first responsiveness with respect to the received request corresponding to the specified request represents time required to complete transmission of the response data with respect to the received request corresponding to the specified request, and
    the second responsiveness with respect to the received request that does not correspond to the specified request represents time required to complete transmission of the response data with respect to the received request that does not correspond to the specified request.

15. A control apparatus communicably coupled through an in-vehicle communication line to at least one device for controlling an equipment unit installed in a vehicle, said control apparatus comprising:
    an identifying unit configured to receive a request transmitted from the at least one device, said request including information representing a content thereof, said identifying unit being configured to identify a content of the received request according to the information;
    a load detecting unit configured to detect a device process load required to control the equipment unit;
    a monitoring unit configured to monitor a traffic load in the in-vehicle communication line; and a load reducing unit configured to reduce a communication load required to transmit response data with respect to the received request according to (a) the identified content of the received request, (b) the detected load, and (c) the monitored traffic load.

16. A control apparatus according to claim 15, wherein said load reducing unit is configured to change a wait time elapsed between (a) receiving the request and (b) starting to transmit the response data.

17. A control apparatus according to claim 15, further comprising a transmitting unit configured to divide the response data into a plurality of frames and to transmit the frames at intervals, and wherein said load reducing unit is configured to change the intervals between transmission of the frames.

18. A control apparatus communicably coupled through an in-vehicle communication line to at least one device for controlling an equipment unit installed in a vehicle, said control apparatus comprising:
an identifying unit configured to receive a request transmitted from the at least one device, said request including information representing (a) a content of the request and (b) a source of the transmitted request, said identifying unit being configured to identify a content of the received request and a source of its transmission according to the information;
a device load detecting unit configured to detect a device process load required to control an associated equipment unit;
a monitoring unit configured to monitor a traffic load in the in-vehicle communication line; and
a load reducing unit configured to reduce a communication load required to transmit response data with respect to the received request according to (a) the identified content of the received request, (b) the identified source of transmitting the request, (c) the detected load, and (d) the monitored traffic load.

19. A control apparatus communicably coupled through an in-vehicle communication line to at least one device for controlling an equipment unit installed in a vehicle, said control apparatus comprising:
a computer configured to execute a program which effects:
a traffic load determining process to monitor a traffic load in the in-vehicle communication line and to determine if the monitored traffic load exceeds a predetermined threshold level;
a request determining process to receive a request transmitted from the at least one device and to determine whether the received request corresponds to a previously specified request when the monitored traffic load exceeds the predetermined threshold level; and
a changing process to change a mode of transmitting response data with respect to the received request when the received request corresponds to the previously specified request, thereby increasing a first responsiveness with respect to the received request corresponding to the specified request as compared with a second responsiveness with respect to the received request that does not correspond to the specified request.

20. A control apparatus according to claim 19, wherein said computer is configured to execute the traffic load determining process, and when it is determined that the monitored traffic load does not exceed the predetermined threshold level, said computer is configured (a) to skip the request determining process and (b) to execute the changing process to change the mode of transmitting response data with respect to the received request if it is determined that the received request corresponds to the previously specified request by the request determining process.

21. A computer-readable storage unit including a program readable by a computer, said computer being communicably coupled through an in-vehicle communication line to at least one device for controlling an equipment unit installed in a vehicle, said program causing the computer to:
receive a request transmitted from the at least one device and to determine whether the received request corresponds to a previously specified request; and
change a mode of transmitting response data with respect to the received request according to a result of the determining process such that a first responsiveness with respect to the received request corresponding to the specified request increases as compared with a second responsiveness with respect to the received request that does not correspond to the specified request.

22. A method of communicating through an in-vehicle communication line with at least one device installed in a vehicle and controlling an equipment unit installed in a vehicle, said method comprising:
receiving a request transmitted from the at least one device installed in a vehicle and controlling an equipment unit installed in said vehicle;
determining whether the received request corresponds to a previously specified request; and
changing a mode of transmitting response data with respect to the received request according to a result of the determining step such that a first responsiveness with respect to the received request corresponding to the specified request increases as compared with a second responsiveness with respect to the received request that does not correspond to the specified request.

23. A method for controlling time required for transmitting data in response to received requests on an in-vehicle communication line connecting plural vehicular control units which respond to plural different types of data requests from one another or from a service tool when it is connected to said communication line, said method comprising:
determining the type of received data request; and
if the received data request is of a predetermined type, then transmitting data in response thereto using an expeditious data transmission mode which expedites completion of such transmission as compared to a data transmission mode used for responding to other types of received data requests;
wherein said expeditious data transmission mode transmits data bytes of greater size and at shorter intervening time intervals than is the case for said other transmission modes.

* * * * *